(12) United States Patent
Miles

(10) Patent No.: US 12,182,247 B1
(45) Date of Patent: Dec. 31, 2024

(54) SYSTEMS AND METHODS FOR AUTHENTICATION OF PHYSICAL ACCESS TOKENS AT ACCESS TERMINALS

(71) Applicant: Stanley Kevin Miles, Foresthill, CA (US)

(72) Inventor: Stanley Kevin Miles, Foresthill, CA (US)

( * ) Notice: Subject to any disclaimer, the term of this patent is extended or adjusted under 35 U.S.C. 154(b) by 0 days.

(21) Appl. No.: 18/585,011

(22) Filed: Feb. 22, 2024

(51) Int. Cl.
*G06F 21/34* (2013.01)

(52) U.S. Cl.
CPC .................................. *G06F 21/34* (2013.01)

(58) Field of Classification Search
CPC ....................................................... G06F 21/34
USPC ........................................................... 726/19
See application file for complete search history.

(56) References Cited

U.S. PATENT DOCUMENTS

| | | | |
|---|---|---|---|
| 5,805,702 A | 9/1998 | Curry et al. | |
| 6,789,068 B1 | 9/2004 | Blaze et al. | |
| 7,346,579 B2 * | 3/2008 | Matsumoto | G06Q 20/102 705/16 |
| 7,835,994 B1 | 11/2010 | Hopkins, III | |
| 9,715,690 B2 | 7/2017 | Licciardello et al. | |
| 10,079,683 B1 | 9/2018 | Chebaro | |
| 10,089,612 B2 | 10/2018 | Wolfs et al. | |
| 10,277,400 B1 | 4/2019 | Griffin et al. | |
| 10,552,637 B1 | 2/2020 | Phillips et al. | |
| 11,004,072 B2 | 5/2021 | Georgiadis et al. | |
| 11,301,847 B1 | 4/2022 | Chang et al. | |
| 11,405,189 B1 | 8/2022 | Bennison | |
| 11,803,840 B1 | 10/2023 | Smith et al. | |
| 11,968,265 B2 | 4/2024 | Devine et al. | |
| 2003/0061170 A1 | 3/2003 | Uzo | |
| 2004/0083182 A1* | 4/2004 | Moribatake | H04L 9/321 705/64 |
| 2008/0027865 A1 | 1/2008 | Usui et al. | |
| 2011/0276402 A1 | 11/2011 | Boone et al. | |
| 2012/0028609 A1 | 2/2012 | Hruska | |
| 2012/0072353 A1 | 3/2012 | Boone et al. | |
| 2013/0159188 A1 | 6/2013 | Andon | |
| 2014/0201086 A1 | 7/2014 | Gadotti et al. | |
| 2014/0379584 A1 | 12/2014 | Ward | |
| 2015/0106275 A1 | 4/2015 | Wolfs et al. | |
| 2015/0363774 A1 | 12/2015 | Priebatsch et al. | |
| 2016/0027015 A1 | 1/2016 | Redpath | |

(Continued)

OTHER PUBLICATIONS

Notice of Allowance issued in U.S. Appl. No. 18/585,017 on May 2, 2024.

*Primary Examiner* — Jacob Lipman
(74) *Attorney, Agent, or Firm* — Foley & Lardner LLP

(57) ABSTRACT

In certain embodiments, a physical network access token at a network access terminal may be authenticated for modification of records at a remote server system. In some embodiments, a set of records and counterpart records having the same record identifiers and resource amounts may be stored independently on a physical token or user device and the remote server system. When a connection is established between an access terminal and the physical token (e.g., for authenticating a modification of record(s)), the access terminal may transmit input data to the token, which may use the input data with the records stored on the token to generate authentication data, which may be used by the remote server to authenticate a network action requested via the token.

20 Claims, 14 Drawing Sheets

(56) References Cited

U.S. PATENT DOCUMENTS

| | | |
|---|---|---|
| 2016/0212126 A1 | 7/2016 | Sadacharam et al. |
| 2017/0083917 A1 | 3/2017 | Sjoholm |
| 2017/0293902 A1 | 10/2017 | Florimond |
| 2017/0323354 A1 | 11/2017 | Martell |
| 2018/0152304 A1* | 5/2018 | Ebrahimi .............. H04L 9/3297 |
| 2018/0276666 A1* | 9/2018 | Haldenby ............. H04L 9/3268 |
| 2018/0336553 A1 | 11/2018 | Brudnicki et al. |
| 2019/0014149 A1 | 1/2019 | Cleveland et al. |
| 2019/0392409 A1 | 12/2019 | Mei |
| 2020/0005290 A1 | 1/2020 | Madisetti et al. |
| 2020/0154270 A1 | 5/2020 | Byington et al. |
| 2020/0167798 A1 | 5/2020 | Lee et al. |
| 2020/0279458 A1 | 9/2020 | France |
| 2020/0286170 A1 | 9/2020 | Kramer et al. |
| 2021/0209582 A1 | 7/2021 | Paliwal et al. |
| 2021/0209684 A1 | 7/2021 | Foote et al. |
| 2021/0406878 A1 | 12/2021 | Ferenczi et al. |
| 2022/0108314 A1 | 4/2022 | Mehta et al. |
| 2022/0237599 A1 | 7/2022 | Petersen et al. |
| 2022/0284112 A1 | 9/2022 | Seader et al. |
| 2023/0216679 A1 | 7/2023 | Tomar |
| 2023/0252382 A1 | 8/2023 | Simpson |
| 2023/0252435 A1 | 8/2023 | Arvapally et al. |
| 2023/0267226 A1 | 8/2023 | Balinsky et al. |
| 2023/0283463 A1 | 9/2023 | Shaffer et al. |
| 2023/0291562 A1 | 9/2023 | Lim |
| 2023/0325833 A1 | 10/2023 | Chen et al. |
| 2023/0360042 A1 | 11/2023 | Doney et al. |
| 2023/0379179 A1 | 11/2023 | Davis et al. |
| 2023/0396454 A1 | 12/2023 | Grover |
| 2023/0401574 A1 | 12/2023 | Smith et al. |
| 2023/0412639 A1 | 12/2023 | Xu et al. |
| 2023/0419308 A1 | 12/2023 | Madisetti et al. |
| 2023/0421543 A1 | 12/2023 | Doney et al. |
| 2024/0005312 A1 | 1/2024 | Kulkarni et al. |
| 2024/0005409 A1 | 1/2024 | Doney |
| 2024/0029051 A1 | 1/2024 | Sethia et al. |
| 2024/0070789 A1 | 2/2024 | Jenson |
| 2024/0086906 A1 | 3/2024 | Sota et al. |
| 2024/0086911 A1 | 3/2024 | Merkel et al. |
| 2024/0089105 A1 | 3/2024 | Duque et al. |
| 2024/0095220 A1 | 3/2024 | Isaacs et al. |
| 2024/0104642 A1 | 3/2024 | Kang et al. |
| 2024/0106671 A1 | 3/2024 | Fortuna et al. |
| 2024/0112160 A1 | 4/2024 | Xu et al. |
| 2024/0126919 A1 | 4/2024 | Ankrom et al. |
| 2024/0137230 A1 | 4/2024 | Osborn et al. |

* cited by examiner

SYSTEMS AND METHODS FOR AUTHENTICATION OF PHYSICAL ACCESS TOKENS AT ACCESS TERMINALS

BACKGROUND

As the world becomes more technologically advanced and dependent on computer systems, cyberattacks are increasing in sophistication and intensity. These attacks include the use of exploits to steal proprietary information, spread malware, or cause other problems. While existing defense and monitoring solutions help alleviate the risks of potential attacks, discovering data or security breaches can be difficult, and when/if finally discovered, significant negative effects from such events may have already occurred.

SUMMARY

Physical authentication tokens are a useful and convenient method of authenticating users for various reasons. For example, they may be used at access terminals so that authorized users such as medical professionals may verify themselves to enable them to perform actions with sensitive assets. For example, medical professionals may use such physical authentication tokens to authenticate themselves to enable modification of patient records. Physical access tokens are often employed due to their ease of use (e.g., tapping, detecting, and verifying at a proximate location) and because such physical tokens are less susceptible to remote cyberattacks (e.g., because physical access to the tokens is limited).

However, as bad actors perpetrating cyberattacks become more sophisticated and more pervasive in an increasingly interconnected world, the risk of attacks involving the interception and manipulation of communication between legitimate devices continues to grow. For example, attacks, such as packet sniffing, wireless interception, relay attacks, etc., have become common ways of enabling bad actors to obtain unauthorized access or fraudulent manipulation of sensitive data, which in turn may have wide-reaching effects, including disruptions of operations in entities as well as identity theft and personal safety risks to individuals. In medical applications, breach of such sensitive data may enable identity theft, financial loss, risk of discrimination and stigmatization, or the like.

In one application of physical access tokens, such tokens may be used by users including educational professionals or medical professionals, at access terminals (e.g., school network devices, medical network devices) to authenticate modifications to sensitive records (e.g., school records, medical records such as electronic health records) stored at a remote server. In order to prevent bad actors from intercepting sensitive data, it is important to enable verification of physical tokens and modification of records without transmission of privileged information or data derived from privileged information.

Accordingly, a mechanism is desired that would enable individual users to transmit authentication data to authenticate modification of records without the need for sensitive data, such as passwords, keys, record identifiers, etc., to be transmitted and potentially intercepted by unwanted parties. One mechanism to enable individual users to enable secure authentication of a user at an access terminal includes verification of a physical access token at an access terminal based on comparing authentication data generated using data from counterpart records at the physical access token and remote server without transmission of data from the counterpart records. For example, medical professionals may verify themselves using a physical access token such as a key card which generates authentication data (e.g., hash value) using sensitive information stored thereon. The key card may store identical sensitive information as the server, and so may be enabled to generate the same authentication data as can be generated by the server, such as inputting the sensitive information into a deterministic function (e.g., hashing function). This authentication data may be compared to determine whether the key card holds the correct sensitive information and upon authentication, the remote server may enable the medical professional to make updates or generate new medical records.

The techniques disclosed herein enable a secure authentication process in at least two ways. For example, the user may identify themselves or the records they wish to modify without transmitting information that can be used by interceptors given that the records and record identifiers are not transmitted themselves. Further, no interceptors can store the transmitted data for use at a later date, as after each session between the physical authentication token and the remote server via an access terminal, the records are modified independently in the same or similar manner at both the physical authentication token and remote server, rendering past transmissions useless.

Aspects of the invention relate to methods, apparatuses, or systems for facilitating authentication of a physical access token for modification of records at an access terminal, for example, authenticating a physical access token to enable modification of one or more records stored at a remote server. In some embodiments, a set of records may be stored on the physical access token, and counterpart records may be stored independently on the remote server. Each of the records and counterpart records may include a record identifier, a resource amount, or other data. Responsive to a connection being established between the access terminal and the physical access token (e.g., to initiate a modification to the resource amount of the records), the access terminal may transmit input data (e.g., a random seed value, a requested resource amount to the physical access token, etc.).

The input data may be used by the physical token along with the set of records stored at the physical access token to generate authentication data transmitted to the access terminal. The physical access token may update the set of records to reflect a transfer corresponding to the resource amount by generating a new record that (i) is a modified instance of the first record and (ii) comprises a resource amount and a record identifier different from the record identifier of the first counterpart record.

The access terminal may transmit the received authentication data as well as the input data to the remote server as a verification request. The remote server may then access a set of counterpart records at the remote server (e.g., counterpart to those stored in the token) to perform verification using a hash-based value derived from hashing a combination of inputs including data from the first counterpart record and the authentication data.

In response to the verification indicating a match between the authentication data and the hash-based value, the remote server may then update the set of records (e.g., independent from the physical access token) to reflect a transfer corresponding to the resource amount by generating a new record that (i) is a modified instance of the first counterpart record and (ii) comprises a resource amount and a record identifier different from the record identifier of the first counterpart record. The remote server may transmit an indication of authorization configured to cause presentation at the access terminal of an authorization related to the resource amount with the physical access token.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "and/or" means "or" unless the context clearly dictates otherwise.

DETAILED DESCRIPTION

Figure 1A:
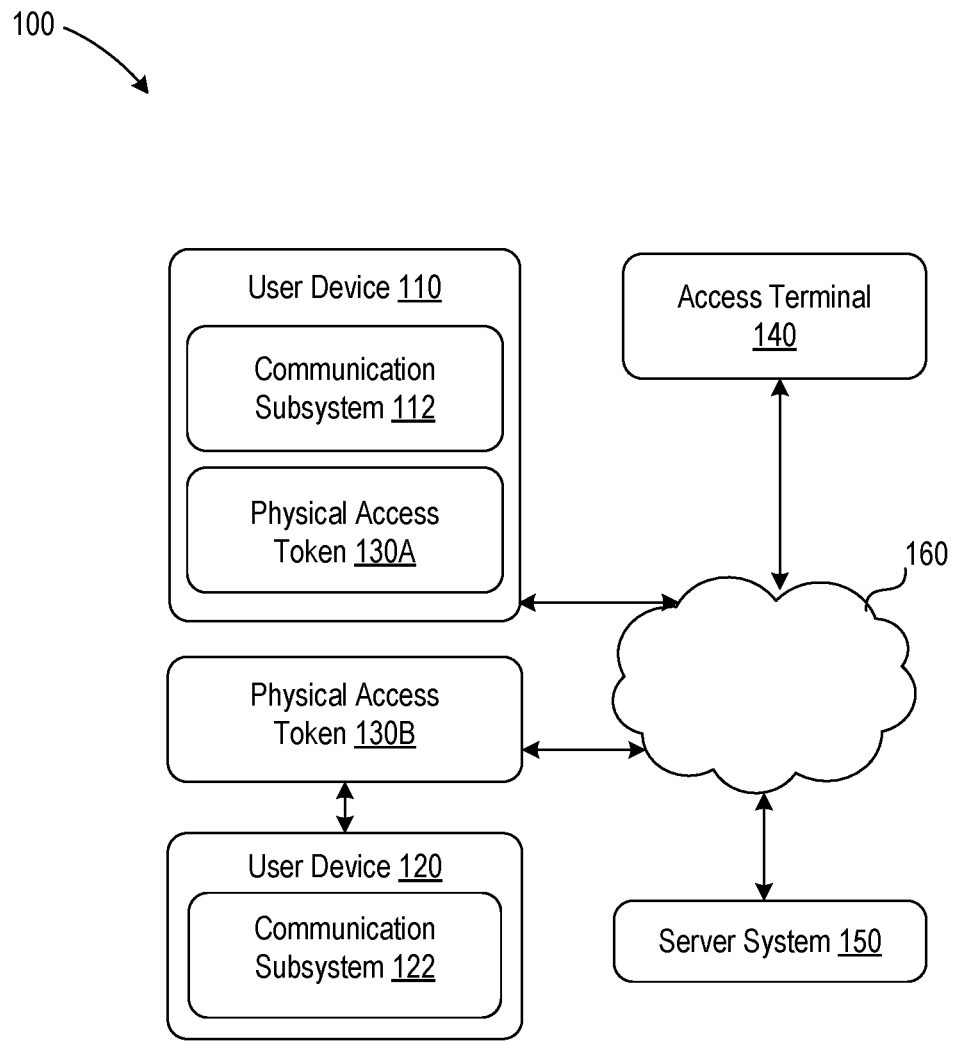
FIG. 1A illustrates different configurations for a physical access token, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Techniques disclosed herein may be used to facilitate secure authentication of a physical access token (e.g., Universal Serial Bus (USB) security key, key card, identification card, key fob, etc.) at an access terminal (e.g., network security terminals, electronic locks, card readers, gate systems, etc.), such as facilitating authentication to enable modification of records (e.g., medical records, school records, government records) without the transfer of sensitive data of the records themselves between the devices. For example, such techniques may enable authorized medical professionals to modify medical records by authenticating themselves without transmitting private information, such as self-identifying information, patient data, etc., that could potentially be used by bad actors in identity theft, to impose financial loss on a medical entity, or the like.

A system for facilitating secure authentication may include a physical access token (e.g., stored value card, identification badge, etc.) and a remote server, each storing counterpart sets of records (e.g., sensitive information). For example, the physical access token may store a set of records in a memory area of the physical access token as described herein. Each record of the set may contain record identifiers and resource amounts, as well as other information. The remote server may store a set of counterpart records containing at least some of the same records stored on the physical access tokens (e.g., each counterpart record of the set of counterpart records may contain the same record identifiers and same resource amounts as those of corresponding records on the physical access token).

Because records on the remote server and physical access token store the same information, but are independently stored on different devices, the physical access token may generate the same authentication data that can be generated independently by the remote server by using its own records to generate the authentication data. For example, the access terminal may transmit authentication data to the remote server. Given that the remote server stores its own set of the same records, the remote server may use its own set of records to independently generate a reference value with which to compare the authentication data. In this way, the physical access token can be validated without transmission of data (e.g., sensitive data) from the records between the physical access token and remote server, as the authentication data is independently generated by the physical access token with data that is known by both parties but never transmitted.

Additionally, or alternatively, the remote server and physical access token may also independently generate new records using modified data (e.g., modified record identifiers or modified resource amounts) from the original records after every session. In this way, even without transmission of sensitive data between parties, the parties may have the same synced records by modifying the records in the same way. In this way, even if a bad actor were to intercept the transmissions between the access terminals, physical access tokens, and remote servers, the content of the transmissions would be unique to each session, unusable, and unable to be reverse engineered.

FIG. 1A illustrates exemplary physical access tokens and different configurations in which they may be implemented, in accordance with one or more embodiments. Exemplary environment 100 includes a physical access token 130A or physical access token 130B. In some examples, the physical access token (e.g., physical access token 130B) is separate from an associated user device 120 (e.g., a laptop computer, a smartphone, a desktop computer, an electronic tablet, or another user device) but communicatively coupled to a user device 120. For example, the user device (e.g., mobile phone) may be communicatively coupled to a physical access token (e.g., key card, key fob, identification card) by establishing a secure connection via wireless communication protocols such as near-field communication (NFC) or Bluetooth through the communication subsystem 122 of the user device 120. Alternatively, or additionally, the physical access token 130A is hosted on the user device 110 (e.g., a laptop computer, a smartphone, a desktop computer, an electronic tablet, or another user device).

Figure 1B:
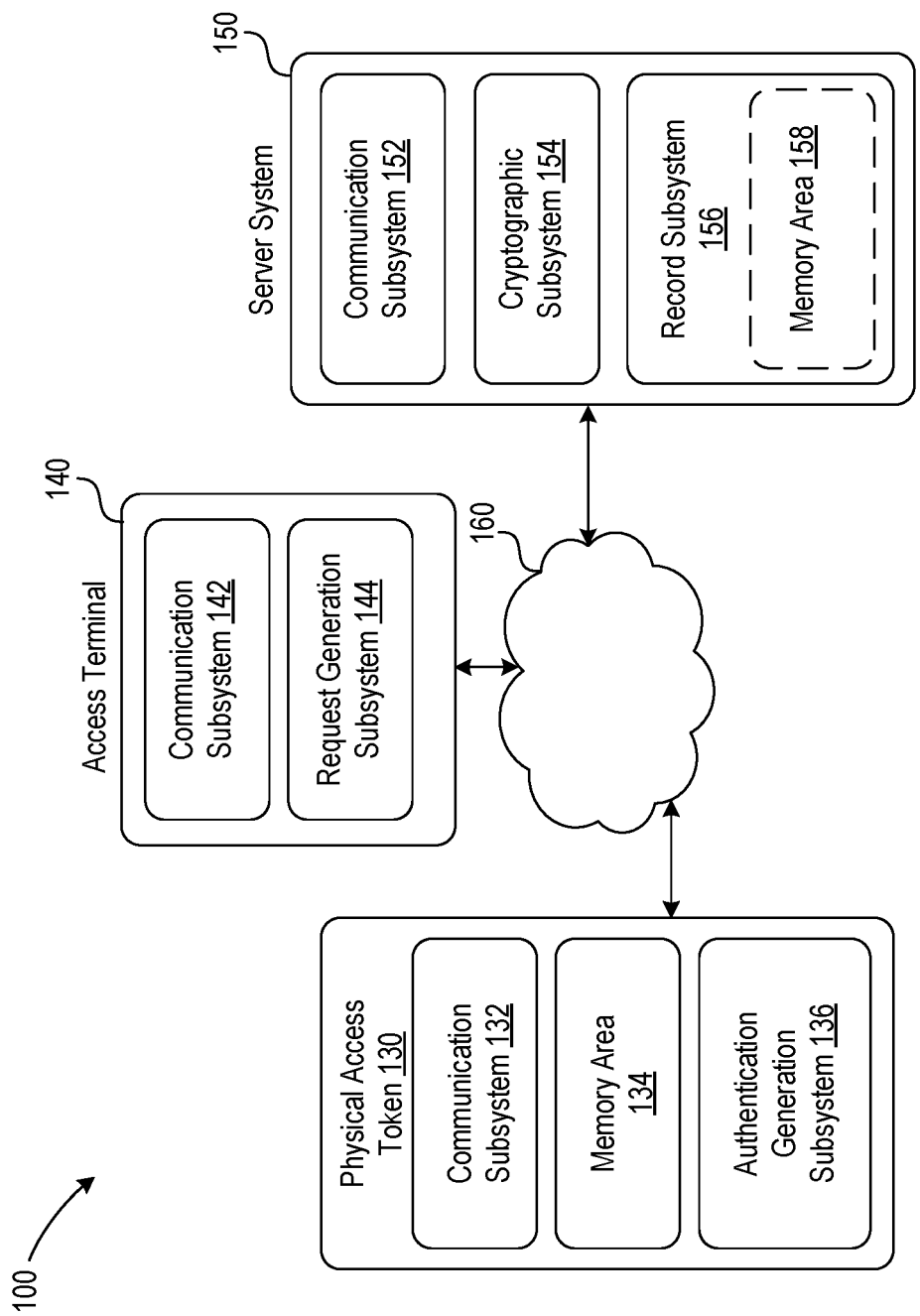
FIG. 1B shows an environment for facilitating authentication of physical access tokens at access terminals, in accordance with one or more embodiments.
Figure 6A:
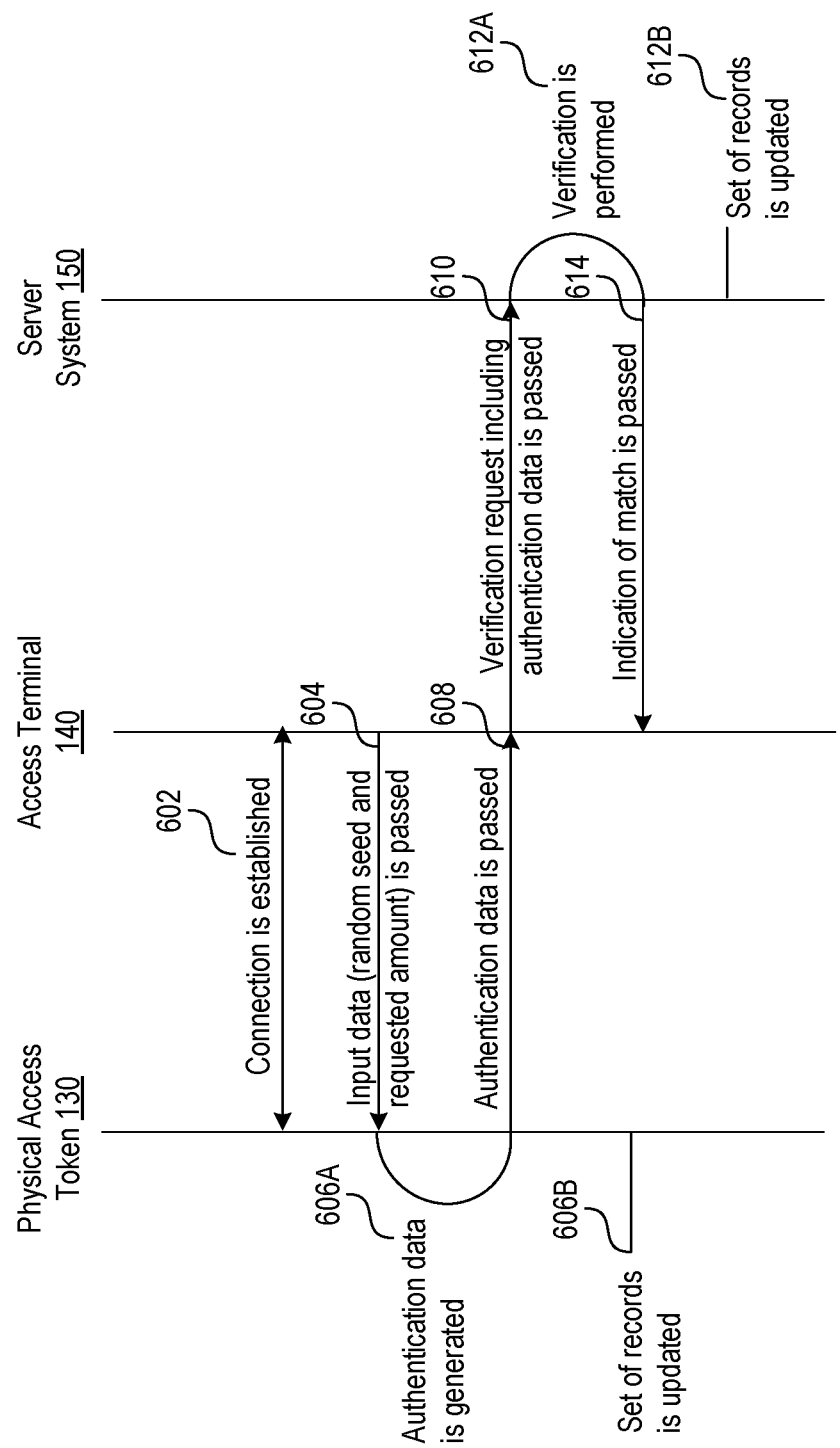
FIG. 6A shows a first exemplary flowchart of a method for facilitating authentication of physical access tokens at access terminals, in accordance with one or more embodiments.

FIG. 1B shows an environment for facilitating authentication of physical access tokens at access terminals, in accordance with one or more embodiments. The environment of FIG. 1B may be used according to the exemplary flowcharts of FIG. 6A, FIG. 6B, FIG. 6C, FIG. 6D, or FIG. 6E. For example, FIG. 6A is one exemplary process for facilitating authentication at a network access terminal (e.g., for modification of network records at a remote server system to prevent malicious or unauthorized access to associated resources). For example, a user may seek to authenticate at a network access terminal (e.g., to modify records at the access terminal). In one example, the records may include data indicative of resource amounts (e.g., monetary value, tokens, etc.).

Physical access token 130 (e.g., physical access token 130A or physical access token 130B) is also in communication with access terminal 140 and server system 150 (e.g., remote server system) via the network 160. Network 160 may be a wired or wireless connection such as a local area network, a wide area network (e.g., the Internet), or a combination thereof. For example, physical access token 130 may establish a connection with the access terminal 140 (e.g., either via a communication subsystem 112 of the user device 110 on which it is hosted or via a communication protocol, such as NFC or Bluetooth, through network 160).

As described herein, the physical access token (e.g., phone application, physical key card, stored value card, etc.) may establish a connection with the access terminal (e.g., kiosk, ATM, point-of-sale (POS) system) via the network 160 as described herein. In some examples, the connection may utilize NFC such that, when the physical access token comes into a minimum proximity with the access terminal, a connection between the two devices is established automatically, and a communication session is initiated.

The access terminal 140 may establish communication with the physical access token via communication subsystem 142 of access terminal 140. Communication subsystem 142 may be configured to enable communication via network 160 to physical access tokens and the remote server. Communication subsystem 142 may include software components, hardware components, or a combination of both. For example, communication subsystem 142 may include a network card (e.g., a wireless network card or a wired network card) that is associated with software to drive the card.

For example, in the example of FIG. 6A, the physical access token and the access terminal may establish a connection at step 602 (e.g., via communication subsystem 142 and communication subsystem 152). For example, a user may approach the access terminal and place the physical access token in contact or within close range of the access terminal and activate a communication session between the two devices.

In some embodiments, the physical access token may generate authentication data and send the authentication data to the access terminal via the established connection. For example, in FIG. 6A, the access terminal may transmit input data, such as data including a random seed and an amount of resource that is to be modified on the record(s) during step 604. Responsive to establishing connection with the physical access token (e.g., to enable communication), the access terminal may transmit input data (e.g., specific to the communication session), and the physical token may generate authentication data based on the input data as well as the records stored on the physical access token. The input data may include a random seed value so that the authentication data generated at the physical access token during the session is specific, distinct, and unique to the current session.

As described herein, in some examples, the physical access token may be a stored value card, and the access terminal may be a POS system or other terminal at which the stored value card (SVC) may be used to check balance, receive, or transmit value on the card. In this case, the input data may additionally include information that identifies an amount or value to be spent or added to the stored value card, such as a requested resource amount. This kind of input data may be used to modify the records at the end of the session. For example, where the records correspond to user accounts (e.g., as described herein), the input data may indicate how to modify the resource amount stored on the record.

The physical access token (e.g., physical access token 130A, physical access token 130B) may receive the input data from the access terminal via communication subsystem 132. Communication subsystem 132 of the physical access token may include software components, hardware components, or a combination of both. For example, communication subsystem 132 may include a network card (e.g., a wireless network card or a wired network card) that is associated with software to drive the card.

Communication subsystem 132 may pass at least a portion of data, such as the random seed value and the requested resource amount, or a pointer to the data in memory to other subsystems such as authentication generation subsystem 136. The authentication generation subsystem 136 may also access the set of records from the memory area 134, such as those associated with a user (e.g., owner or other authorized user of the physical access token), where each record may include (a) a record identifier identifying the record of the user and (b) a resource amount associated with the record of the user.

Authentication generation subsystem 136 may then generate authentication data to be used by the remote device to authenticate the modification of the records (e.g., as in step 606A of FIG. 6A). For example, the authentication generation subsystem 136 may use the random seed value, the resource amount, and the set of records stored at the physical access token to generate the authentication data. In some embodiments, the authentication generation subsystem may combine all the record identifiers of the set of records stored on the physical access token, provide the ordered combination as input to a one-way hash function, and use the output of the hash function to generate the authentication data. As another example, an output hash value may be used as at least part of the authentication data, or the output hash value may be used in combination with other data to generate the authentication data. As another example, the output hash value (or a data combination including the output hash value) may be encrypted using a private key (e.g., a key associated with the user, a key associated with the record set, etc.) to generate the authentication data. Authentication generation subsystem 136 may then pass at least a portion of the authentication data or a pointer to the data in memory to the communication subsystem. The communication subsystem 132 may transmit, via the established connection, the authentication data to the access terminal (e.g., as in step 608 of FIG. 6A). As illustrated in FIG. 6A, upon generation of the authentication data, the token may update the set of records stored thereon (e.g., in step 606B).

Communication subsystem 142 of the access terminal 140 may be configured to receive the transmitted authentication data from the physical access token 130. The communication subsystem 142 may then pass at least a portion of the authentication data or a pointer to the data in memory to the request generation subsystem 144. Request generation subsystem 144 may use the received authentication data as well as the resource amount and the random seed value to generate the request such that the server system can independently generate reference data to compare to the authentication data (e.g., using the set of counterpart records at the server system by hashing the record identifiers and the resource amount and random seed value). The communication subsystem of the access terminal may then transmit the generated request, including the authentication data, the requested resource amount, and the random seed value, to the server system.

As exemplified in FIG. 6A, at step 610, the access terminal may further transmit the authentication data to a server system (e.g., a remote server system) as part of a request for verification. The server system may receive the request via network 160 at communication subsystem 152. The communication subsystem 152 may pass at least a portion of the contents of the request (e.g., the resource amount, the random seed value, the authentication data) or a pointer to the data in memory to other subsystems, such as cryptographic subsystem 154. For example, cryptographic subsystem 154 may obtain the resource amount and random seed value. At step 612A (e.g., of FIG. 6A), the server system may verify the authentication data (e.g., responsive to the request). For example, cryptographic subsystem 154 may access counterpart records (e.g., the same but independently stored records at the physical access token) from memory on the server system via record subsystem 156 and memory area 158, described in relation to FIG. 3 herein. The server system may then perform verification (e.g., step 612A of FIG. 6A).

Cryptographic subsystem 154 may generate a reference value with which to compare the authentication data. For example, because the input data should be the same, the generated authentication data from the physical access token and the independently generated reference value on the server system should also be the same. In particular, the input of both the random seed value and the requested resource amount should be the same, as both are supplied by the access terminal. The input of the record data (e.g., the record identifiers, the resource amounts on the records, etc.) should also be the same, as the server system and the physical access terminal should store the same set of records independently (e.g., where each corresponding record comprises the same record identifier, resource amount, and other data disclosed herein).

For example, cryptographic subsystem 154 may access the set of counterpart records from memory area 158 and use at least a portion of the data from the set of counterpart records as an input alongside the random seed value and the requested resource amount. Cryptographic subsystem 154 may generate the hash value by combining all the record identifiers of the set of records stored on the server system, providing the ordered combination as input to a one-way hash function, and using the output of the hash function to generate the reference data. As another example, an output hash value may be used as at least part of the reference data, or the output hash value may be used in combination with other data to generate the reference data.

Cryptographic subsystem 154 may then compare the authentication data to the reference data to determine a similarity score. In one use case, the similarity score may be a binary score of TRUE (e.g., the hash value and the reference value are identical) or FALSE (e.g., the hash value and the reference value are not identical). A similarity score of TRUE may indicate a match between the relevant set of records at the server system and the set of counterpart records at the physical access token, thereby indicating that the physical access token is valid. A similarity score of FALSE may indicate a lack of a match between the relevant set of records at the server system and the set of counterpart records at the physical access token, thereby indicating that the physical access token is not valid.

In some embodiments, as described herein, the physical access token may not only generate the output hash value (or a data combination including the output hash value) based on the inputs but may also encrypt the output hash value (or a data combination including the output hash value) using the private key. In this case, the server system may be further configured to decrypt the received authentication data using a public key (e.g., a key associated with the user, a key associated with the record set, etc.) to further validate that the sender of the authentication data is the correct sender. The comparison subsystem may then be configured to compare the decrypted authentication data and the generated reference data to validate the physical access token.

After verification, the server system may update the set of records stored thereon (e.g., as illustrated in step 612B of FIG. 6A). For example, in response to an indication of a match between the authentication data, or in some cases, the decrypted authentication data, and the reference data, the server system may be further configured to update the set of records stored in the memory area of the server system to reflect a transfer corresponding to the resource amount by generating a new record that (i) is a modified instance of the record stored at the server system and (ii) comprises a resource amount and a record identifier different from the record identifier of the record stored at the server system.

In some embodiments, the record identifier of the new record is based on an output generated by inputting a combination of (i) a secret key stored at the server system and the physical access token, (ii) a time associated with an establishment of connection to the physical access token, or (iii) the record identifier of the first record into a hash-based message authentication code (HMAC) algorithm.

Similarly, the physical access token may also update the set of records stored in the memory area of the physical access token independently or, in some cases, responsive to receiving an indication of a match between the authentication data (or decrypted authentication data) and the reference data by performing steps described above in relation to the modification and generation of new records of the server system. For example, the physical access token may update the set of records to reflect a transfer corresponding to the resource amount by generating a new record on the physical access token that (i) is a modified instance of the record identifier of the original record on the physical access token and (ii) comprises a resource amount and a record identifier different from the record identifier of the original record on the physical access token.

As described herein, the modification performed on the physical access token may be configured to be performed in parallel with the modification performed on the server system. That is, the modification may be performed in the same way, independently, on each of the physical access token and the server system. The protocol for modification or generation of new records may be agreed upon prior to the transfer or may be indicated using a separate signal. The "original" records on the physical access token or server system may be deleted or moved, such as to an archive database or area.

In some embodiments, the server system transmits a notification or other indication of verification. For example, in FIG. 6A, step 614, the server system transmits an indication of a match between the authorization data received and the independently generated reference data. The server system may transmit an indication of authorization via the communication subsystem 152. In some embodiments, the indication may be configured to cause presentation at the access terminal of an authorization related to the resource amount with the physical access token. For example, responsive to receiving the indication of verification (e.g., at communication subsystem 142 of access terminal 140), the access terminal may display a message or visual indicator at a monitor or other display that notifies the user of verification or successful transfer of resources or modification of resources.

Figure 6B:
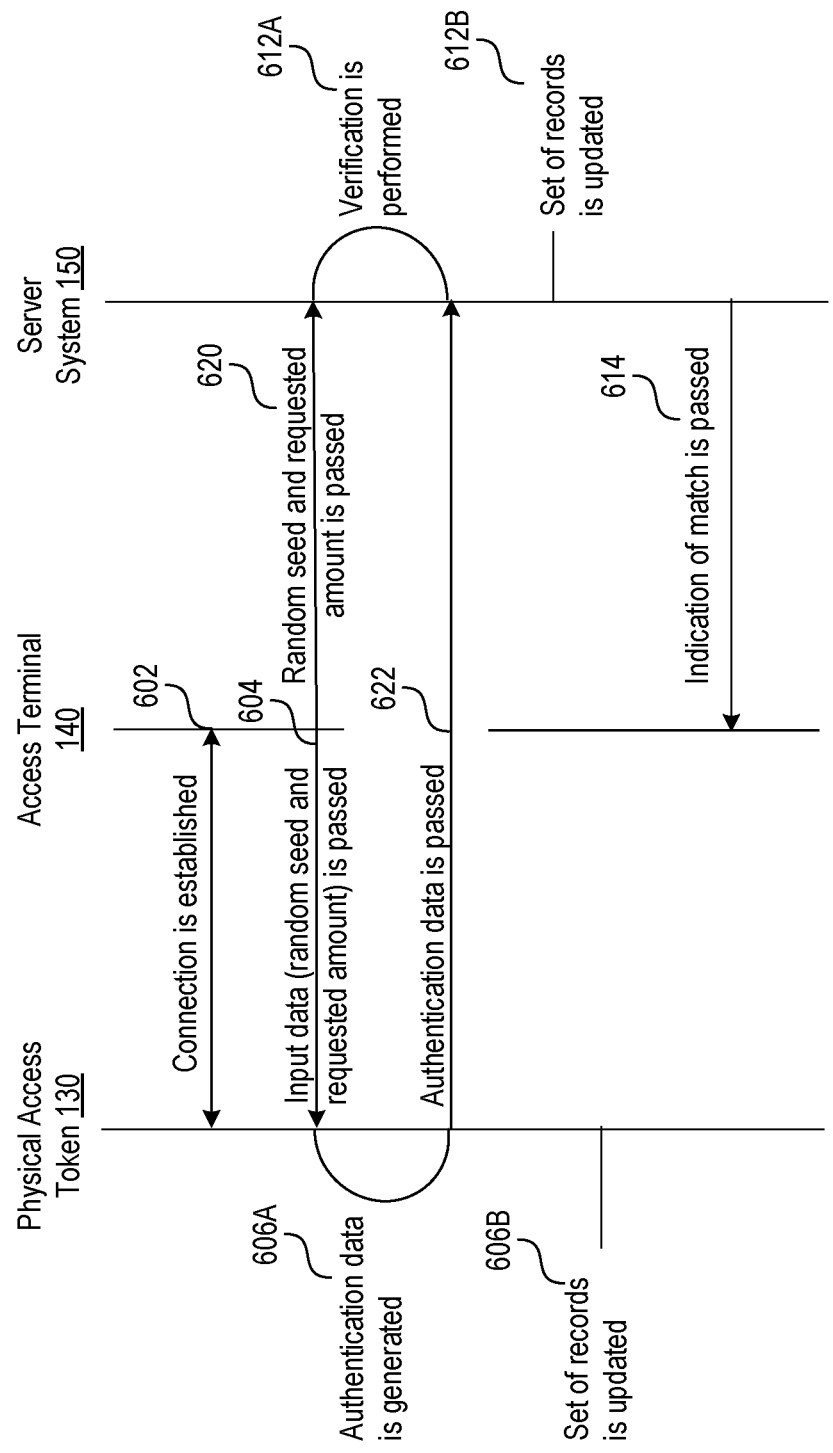
FIG. 6B shows a second exemplary flowchart of a method for facilitating authentication of physical access tokens at access terminals, in accordance with one or more embodiments.

According to some embodiments, after the token generates the authentication data, rather than transmitting the authentication data to the access terminal, the token may transmit the authentication data directly to the server system via communication subsystem 152. For example, FIG. 6B is an exemplary flowchart where the token passes the authentication data to the access terminal. In particular, as in FIG. 6A, the access terminal and physical access token establishes a connection at step 602, and input data is transmitted at step 604 from the access terminal to the physical access token. At step 606A, the token generates the authentication data and, at step 606B, updates the records stored thereon. However, rather than transmitting the authentication data to the access terminal as described in relation with FIG. 6A, the authentication data is passed to the server system at step 622. The server system, as described herein, is enabled to verify the physical token by comparing the authentication data with reference data generated using counterpart records and the same input data as is used in generating the authentication data in step 606A. As such, the server system may receive the input data from either the physical token or from the access terminal as is illustrated in step 620 of FIG. 6B. As in FIG. 6A, the process of FIG. 6B proceeds to step 612A and step 612B, where verification is performed, and the set of records stored on the server system is updated.

According to some embodiments, the user device associated with the physical token (e.g., linked, communicatively coupled, etc.) may perform additional verification of the authentication data. By doing so, the user device can prevent extensive network traffic at the server system and also can further serve to ensure security and parity between the records of the user device, server system, and physical token. For example, FIG. 6C is an exemplary flowchart illustrating a process for additional verification by the user device.

Figure 6C:
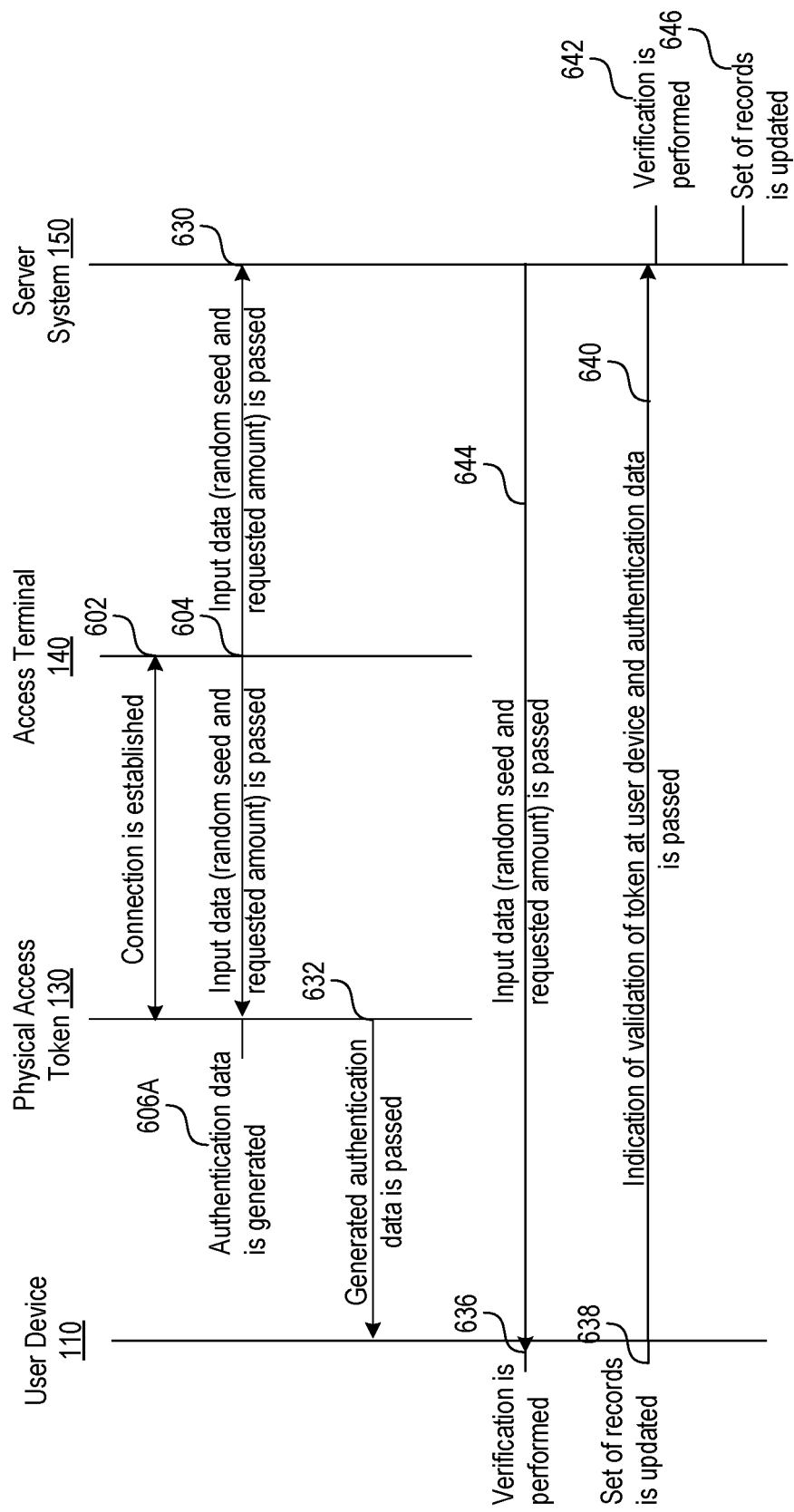
FIG. 6C shows a third exemplary flowchart of a method for facilitating authentication of physical access tokens at access terminals, in accordance with one or more embodiments.

In particular, FIG. 6C includes step 602 where connection is established between the physical access token and the access terminal. At step 604, the input data is passed to the physical token, and at step 606A, the token generates the authentication data. At step 632, as described herein, the authentication data is passed to the user device for additional verification. The user device may store thereon, or otherwise have access to the same one or more records stored on the physical token and server system. As such, the user device may be configured to verify (e.g., at step 636), the authentication data by independently generating reference data as described herein. In order to do so, the user device may obtain the input data from one of either the access terminal or the server system, or both. For example, in the example of FIG. 6C, the input data is transmitted first to the server system at step 630 and passed from the server system to the access terminal at step 644. However, it may be appreciated that the access terminal may transmit the input data directly to the user device instead.

After the user device verifies the authentication data at step 636, the user device may update the records stored thereon at step 638 and cause the same at the token. The user device may then transmit an indication of validation (e.g., verification) to the server system along with the authentication data to the server system at step 640. Alternatively, the server system may receive the authentication data from the token directly. At step 642, the server system performs verification as described herein, and may further update the records stored thereon at step 646.

As described in relation to FIG. 1A, the physical token may be hosted on or part of a smartphone, tablet, or other user device, or the physical token may be a physical device physically separate from the user device but communicatively coupled to the user device. Some aspects described herein with respect to the physical access token may be performed by the user device it is hosted on or otherwise communicatively coupled with. For example, the user device may include memory area 134 rather than having the records stored at the physical access token, and the user device may be configured to additionally generate authentication data for authenticating the physical token at the access terminal (e.g., to enable modification of records stored at the server system). As described herein, the authentication data may be generated based on a resource amount with which to modify the record(s) and data regarding the set of records stored at the token.

In one embodiment, whether hosted on another user device or communicatively coupled to such user device, the physical access token may only store a hash-based output (e.g., a hash or other hash-based value generated using inputs based on record data). For example, in this embodiment, the access terminal, upon establishing a connection with the physical token, may request the hash-based value from the physical token. In this case, the physical access token may transmit the hash-based output generated based on inputting data from one or more records stored on the user device. The transmission of the hash-based output may be used to identify records at the user device or the server system, and the value indicated (e.g., stored) on those records may be used (e.g., for purchases or other transfers). In some examples, the token may further modify the hash-based output using input data received from the access terminal as part of the request. Such input data may include a timestamp indicating a time at which the request or connection was made/transmitted/received, a random seed, a requested amount, etc. The physical access token may modulate the inputs (e.g., the hash-based output, timestamp, random seed, requested amount, etc.) using a function. The function may be predetermined and stored at both the server system and physical token and may include a hash function.

Figure 6D:
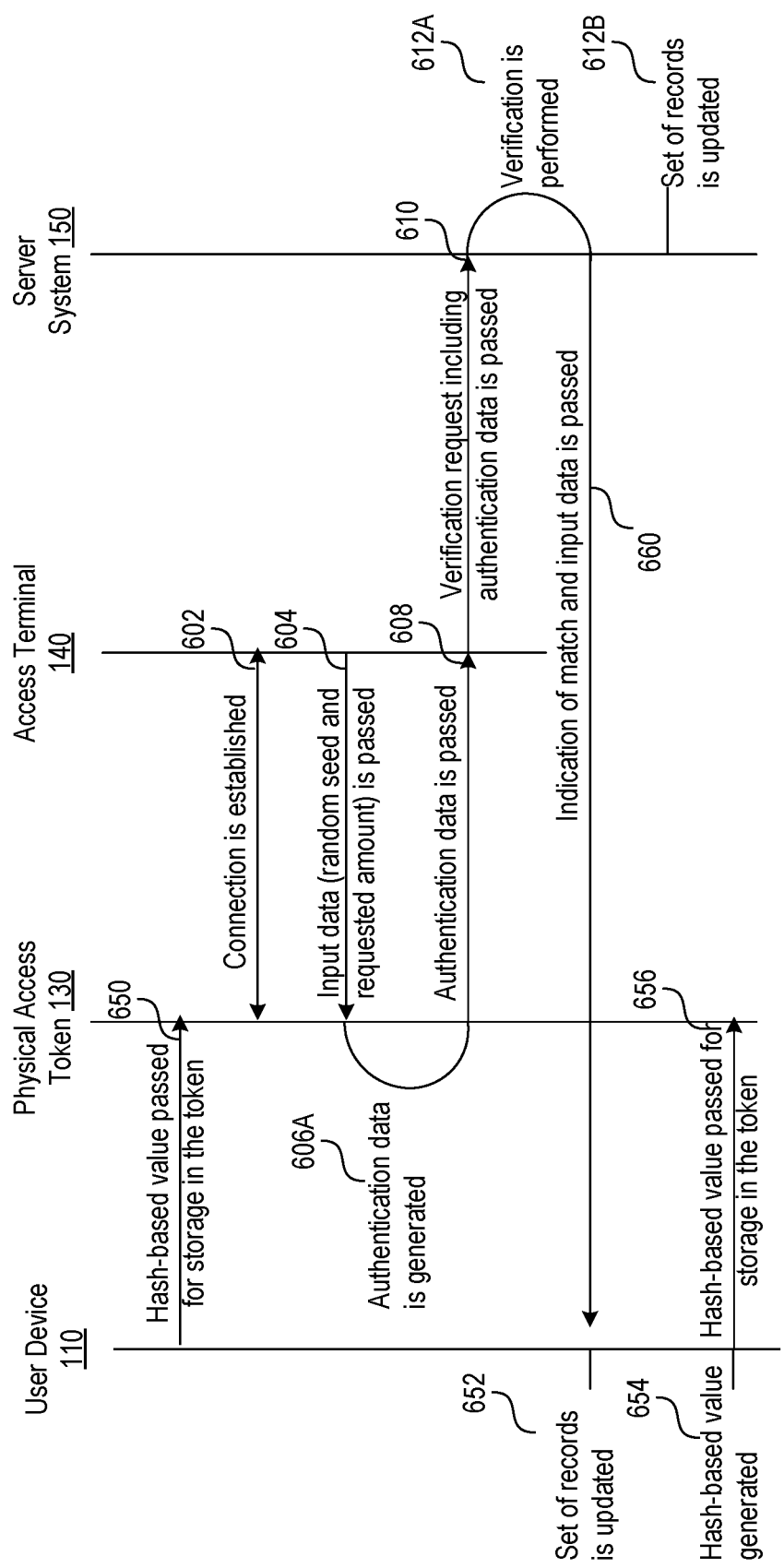
FIG. 6D shows an exemplary flowchart of a method for facilitating authentication of physical access tokens at access terminals where the physical access token stores a hash-based value, in accordance with one or more embodiments.

For example, FIG. 6D is an exemplary flowchart illustrating authentication according to an embodiment where the physical access token does not store the records thereon and instead stores only the hash-based value. In this example, the user device may instead store records and may pass hash-based values for storage at the physical token. For example, in FIG. 6D, the process begins at step 650, where the user device passes a hash-based value for storage. The hash-based value may be representative of record information of records stored on the user device and the server system. As in FIG. 6A, FIG. 6B, and FIG. 6C, the process proceeds to step 602, where the access terminal and token establish a connection. At step 604, the input data is transmitted from the access terminal to the physical access token, and at step 606A, the physical access token generates the authentication data (e.g., by hashing or otherwise combining the input data and hash-based value). The authentication data is passed at step 608 to the access terminal.

At step 610, the access terminal passes the verification request comprising the authentication data to the server system that may perform verification (e.g., step 612A) and update the records stored thereon (e.g., step 612B). Rather than transmit the indication of verification (e.g., a match) to the access terminal, the server system may transmit the indication to the user device at step 660 and the input data may be passed to the user device. The user device may update the records stored thereon at step 652 (e.g., by modifying the amount of resource based on the request amount indicated in the input data) and generate a new hash-based value at step 654. The new hash-based value may then be passed to the token for storage at step 656.

Once authentication has been performed as described herein by the server system, the user device may identify that the physical token has been successfully verified and may initiate a process for modifying the records stored at the user device. For example, the user device may update the set of records stored in the memory area of the user device independently of the server system to reflect a transfer corresponding to the resource amount by generating a new record on the user device that (i) is a modified instance of the record identifier of the original record on the user device and (ii) comprises a resource amount and a record identifier different from the record identifier of the original record on the user device.

The user device may then generate a new hash-based output and transmit it for storage at the physical access token. In this way, the physical access token may not store the records (e.g., corresponding to user accounts) on the physical access token itself but may instead store a hash of data from the records. If a bad actor were to obtain the physical access token itself, the data stored on the physical access token would have no sensitive data to use but rather would contain a meaningless hash.

Figure 6E:
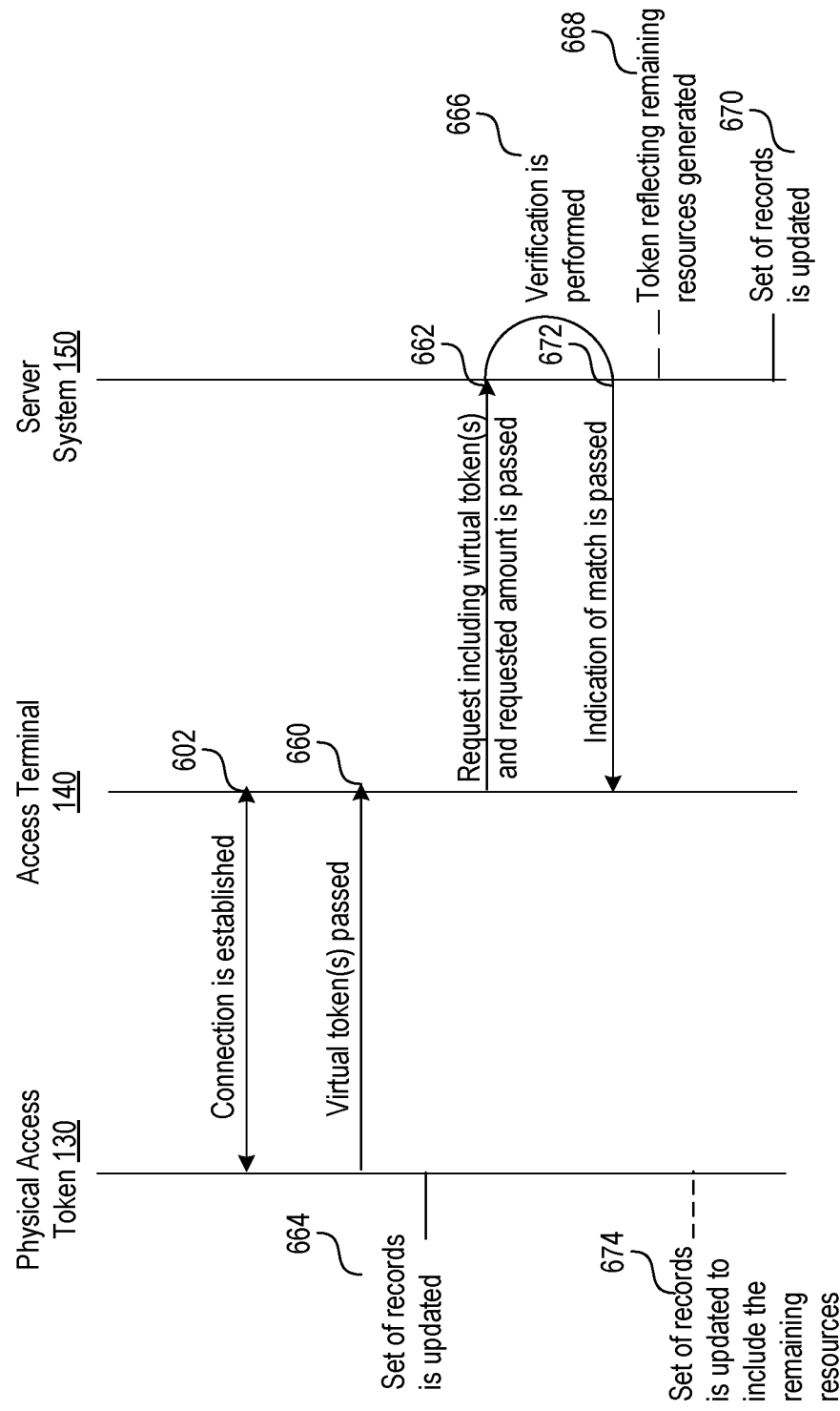
FIG. 6E shows an exemplary flowchart of a method for facilitating authentication of physical access tokens using virtual tokens, in accordance with one or more embodiments.

According to some embodiments, modification of the records may be performed using virtual tokens, in accordance with one or more embodiments. For example, FIG. 6E shows an exemplary flowchart of a method for facilitating authentication of physical access tokens using virtual tokens. In particular, the physical token may be configured to send one or more virtual tokens representing a resource amount. The one or more virtual tokens may be representative of a resource amount of one or more stored records (e.g., the full balance of the corresponding account). Rather than the access terminal requesting a resource amount from the physical token, the token may transmit the full resource amount available to it via the stored one or more records. For example, at step 660, the token may transmit the one or more virtual tokens. For example, the virtual tokens may be a hash-based value generated using, at least in part, data of the records (e.g., record identifiers). At step 662, the access terminal may transmit the virtual token(s) and the request resource amount. The token may also update the set of records at step 664 (e.g., to update the resource amount available in the stored record(s)).

At step 666, the server system may verify the virtual tokens. For example, the server system may identify the records associated with the token (e.g., based on a token identifier or a user identifier) and may use the record information to determine which record the virtual tokens are associated with. Based on the requested resource amount and the amount in the records referenced by the token, the server system may generate a new record associated with the user comprising the remaining resource amount (e.g., in step 668). Both sets of records at the token and the remote device may be updated to reflect the new remaining amount, if any, at step 674 and step 670 respectively. An indication of the match may be transmitted to the access terminal at step 672. In some examples, responsive to the indication of the match, the access terminal may display an indication of verification such as on a screen.

As described in reference to Table 2 herein, in some use cases, even if the respective "original" records are deleted or moved (e.g., to an archive database or area), data of the original records may be mapped to a user (e.g., via a primary identifier) or the records representing the current state of the user's accounts. For example, the server system or the physical access token may further map, to a primary identifier associated with the user, the record identifier of the original record as a previous state and map, to the same primary identifier, the record identifier of the new record as a current-state record. In this way, the server system or the physical access token may still have access to previous transfers of resources or the like.

The primary identifier may be used, for example, during a return or refund process. For example, the server system may receive a return request from an access terminal for returning resources associated with a record. The return request may include the record identifier of the record and the resource amount. The primary identifier may be used to identify previous states of the user's records and to identify the specific record corresponding to the record identifier and resource amount. The system may then execute the return by updating the set of records to reflect a return corresponding to the resource amount by generating another new record that (i) is a modified instance of the record and (ii) comprises a resource amount and a record identifier different from the record identifier of the record.

For example, the server system, upon completing a transaction, may map a previous state of the record reflecting the resource amount and identifier before the transfer occurred and may map a current state of the record reflecting the resource amount and identifier after the transfer occurred. Responsive to a request for returning or refunding the transaction, the system may identify the current and previous states using the primary identifier to find the current record reflecting the most current version of the record (e.g., all prior transactions have been executed). The system may then modify the most current version of the record to return or refund at least a part of the resources and may subsequently map the modified record as a current state using the primary identifier (e.g., the server system), or the physical access token may then update the previous state and current state by mapping, to the primary identifier, the record identifier of the new record as another previous state and mapping, to the primary identifier associated with the user, the record identifier of a new record reflecting the return/refund as a current-state record.

Figure 2A:
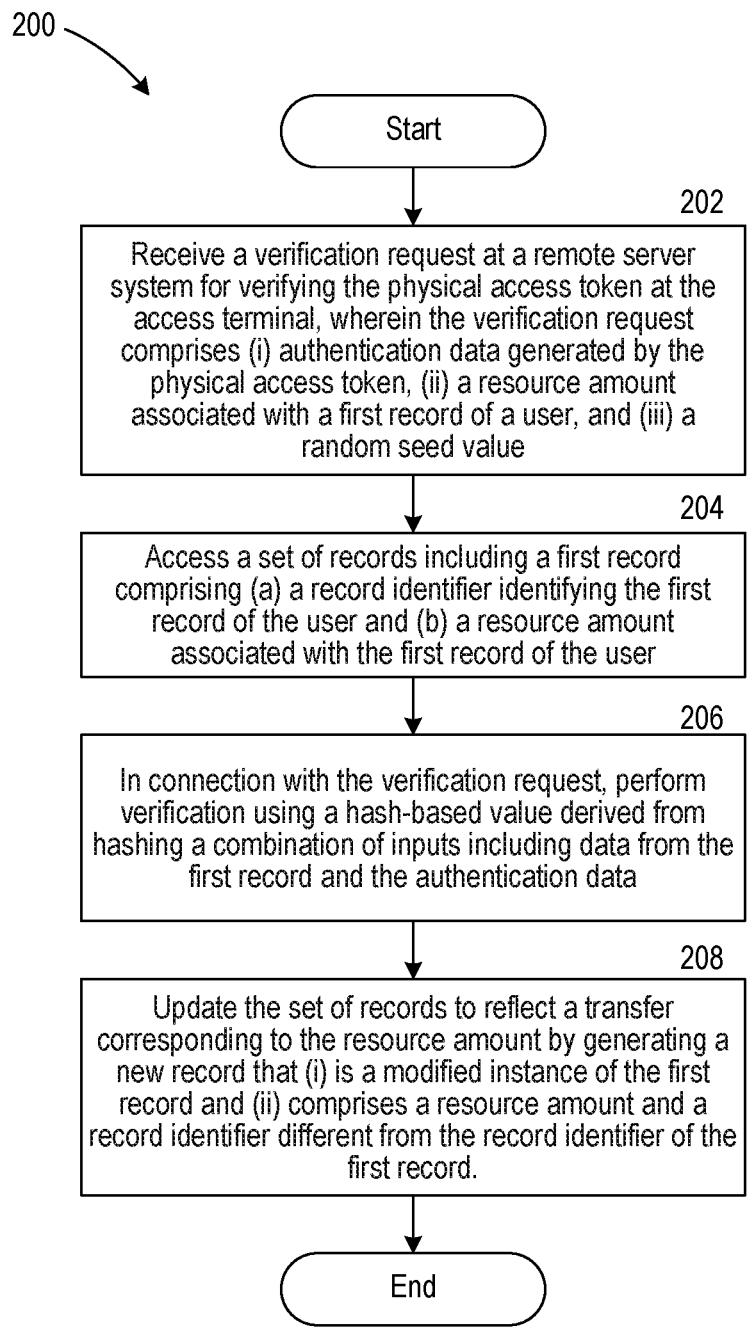
FIG. 2A shows a flowchart of a method for facilitating authentication of physical access tokens at access terminals using a remote server, in accordance with one or more embodiments.

FIG. 2A shows a flowchart of a method 200 for facilitating authentication of physical access tokens at access terminals using a server system (e.g., a remote server system), in accordance with one or more embodiments. The processing operations of each method presented below are intended to be illustrative and non-limiting. In some embodiments, for example, the methods may be accomplished with one or more additional operations not described or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods.

The method 200 may be performed by a remote server system, such as server system 150. In operation 202, a verification request may be received at a remote server system for verifying the physical access token at the access terminal. As an example, the verification request may include (i) authentication data generated by the physical access token, (ii) a resource amount associated with a first record of a user, and (iii) a random seed value. For example, the verification request may be received at a communication subsystem of the remote server system via a network, such as communication subsystem 152 via network 160. As described herein, the physical access token and the remote server system may store or have access to independent sets of records, where corresponding records of each have the same record identifier or the same resource value. The authentication data may be generated using the set of records stored at the physical access token.

In some embodiments, authentication data may include a token, a digital signature, instances of records (e.g., of the record set), or other data used to indicate that the user is an owner of the records of the record set or one or more resources related to the records. In one use case, the user device may store one or more local copies of the records of the record set in persistent storage of the user device, and the user device may generate the authentication data based on one or more portions of such local record copies stored at the user device.

In operation 204, the method includes accessing a set of records including a first record comprising (a) a record identifier identifying the first record of the user and (b) a resource amount associated with the first record of the user. For example, responsive to the verification request, the remote server system may access (e.g., from memory area 158) the set of records stored at the remote server via record subsystem 156 in order to generate reference data in a same or similar manner as the physical authentication token generates the authentication data. By doing so, the remote server system may compare the authentication data to the reference data. The values should be the same, as the underlying records stored independently on each of the remote server system or physical access token should be the same as well.

For example, in operation 206, the remote server system may, in connection with the verification request, perform verification using a hash-based value derived from hashing a combination of inputs including data from the first record and the authentication data. According to one embodiment, one or more portions of the records (of the record set) stored at the remote server system may be hashed to generate a hash value of the record portions. As an example, all the record identifiers of the records may be combined in a specified order, and the ordered combination or other input data may be provided as input to a one-way hash function to output the hash value, also referred to herein as reference data. In examples where the authentication data comprises an encrypted hash, a public key associated with the user may be used to decrypt the authentication data. The verification may include comparing the hash value (e.g., the reference data) and the authentication data (or the decrypted authentication data) to determine a similarity score. In one use case, the similarity score may be a binary score of TRUE (e.g., the hash value and the authentication data are identical) or FALSE (e.g., the hash value and the authentication data are not identical). A similarity score of TRUE may indicate that the authentication data is valid. A similarity score of FALSE may indicate that the authentication data is invalid. Operation 206 may be performed by a subsystem that is the same as or similar to cryptographic subsystem 322, in accordance with one or more embodiments.

In operation 208, the set of records may be updated to reflect a transfer corresponding to the resource amount by generating a new record that (i) is a modified instance of the first record and (ii) comprises a resource amount and a record identifier different from the record identifier of the first record.

Figure 2B:
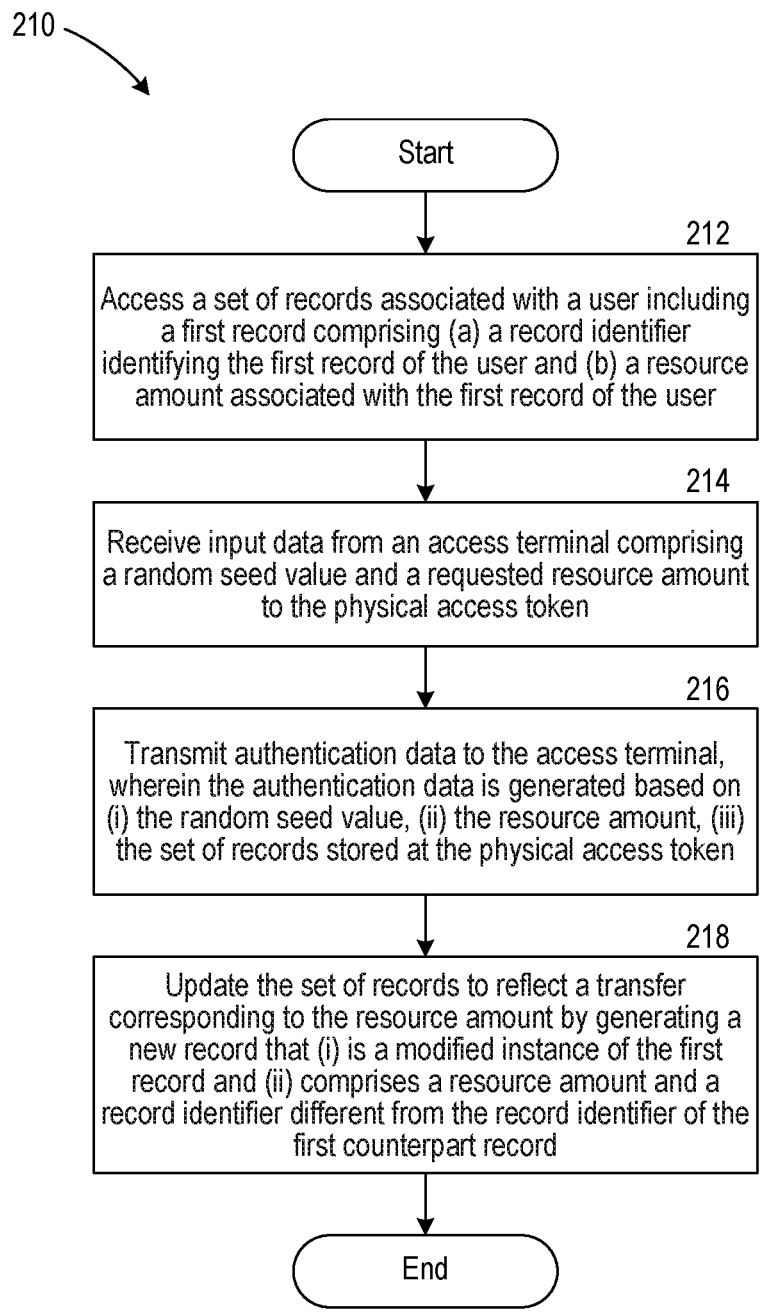
FIG. 2B shows a flowchart of a method for facilitating authentication of physical access tokens at access terminals using a physical authentication token, in accordance with one or more embodiments.

FIG. 2B shows a flowchart of a method 210 for facilitating authentication of physical access tokens at access terminals using a physical authentication token, in accordance with one or more embodiments. The method 210 may be performed by a physical access token (e.g., physical access token 130A, physical access token 130B). As described herein, the physical access token may be communicatively coupled to a user device or hosted on a user device in some embodiments. Aspects of method 200 may be performed wholly on the user device or on a physical token. Alternatively, or additionally, some steps may be performed by the user device, and others may be performed by the physical token.

In operation 212, a set of records may be accessed, where the set of records is associated with a user and includes a first record comprising (a) a record identifier identifying the first record of the user and (b) a resource amount associated with the first record of the user. As described herein, according to some examples, the set of records may be stored in a memory area of the physical access token or the user device, and the physical token may be enabled to access the set of records.

In operation 214, input data is received from an access terminal comprising a random seed value and a requested resource amount to the physical access token. In some embodiments, the input data may include other information specific to the session, such as a timestamp indicative of the connection being established, the request being transmitted, etc. As described herein, the physical access token or the user device may generate authentication data using the input data, such as by hashing a combination of record identifiers of one or more records of the set of records stored at the physical access token, the random seed value, or the resource amount to obtain a hash value. The physical access token or user device may also further encrypt the generated hash value using a private key associated with the user.

In operation 216, authentication data is transmitted to the access terminal (e.g., via communication subsystem 152). The authentication data is generated based on (i) the random seed value, (ii) the resource amount, or (iii) the set of records stored at the physical access token as described above. In operation 218, the set of records is updated to reflect a transfer corresponding to the resource amount by generating a new record that (i) is a modified instance of the first record and (ii) comprises a resource amount and a record identifier different from the record identifier of the first counterpart record.

For example, a second set of records associated with the user may be generated based on records of the first set such that each record of the second set is a modified instance of a corresponding record of the first set. As an example, a record instance of the second set may be generated such that at least a record identifier of the generated record instance may be different from the record identifier of the corresponding record of the first set. Additionally, or alternatively, a resource amount or other parameter value of the generated record instance may be different from the resource amount or other parameter value of the corresponding record of the first set.

Figure 2C:
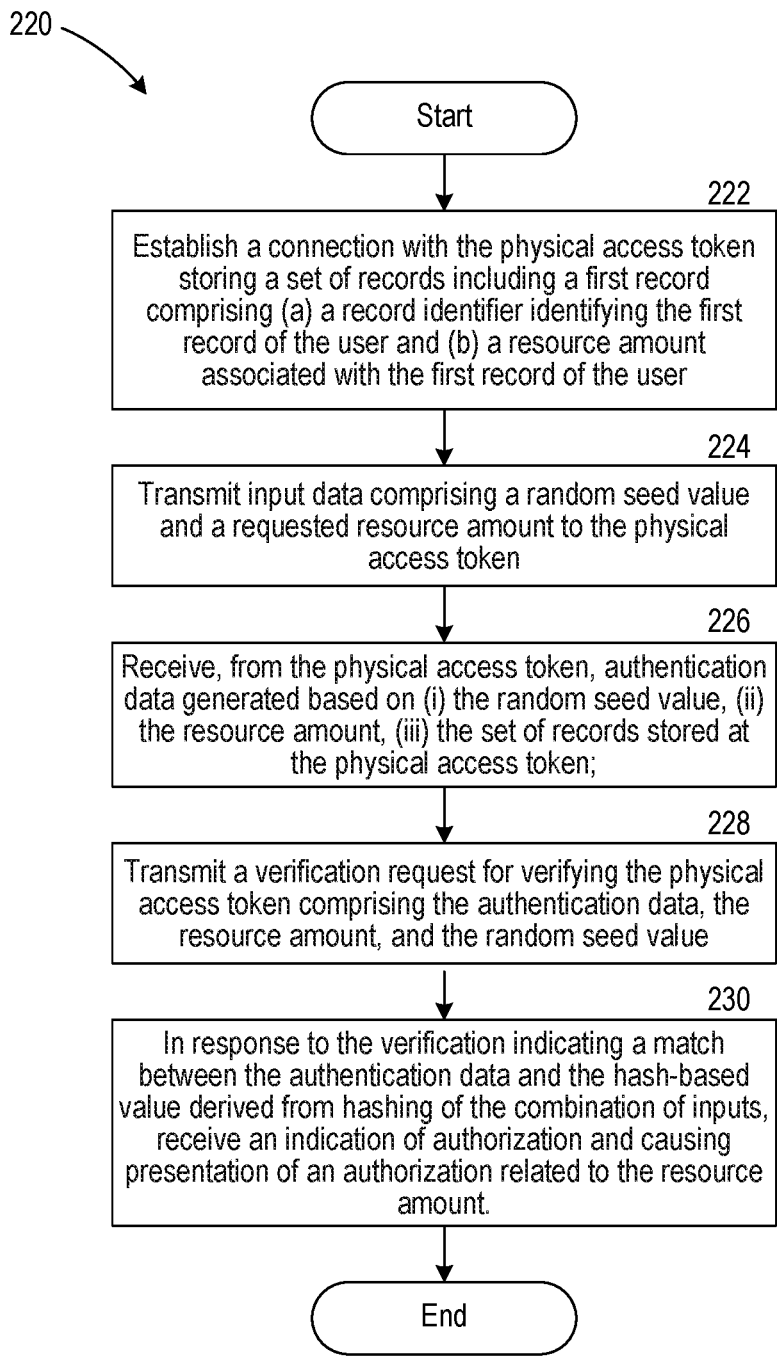
FIG. 2C shows a flowchart of a method for facilitating authentication of physical access tokens at access terminals using an access terminal, in accordance with one or more embodiments.

FIG. 2C shows a flowchart of a method 220 for facilitating authentication of physical access tokens at access terminals using an access terminal, in accordance with one or more embodiments. The method 220 may be performed by an access terminal such as access terminal 140. In operation 222, a connection may be established with the physical access token (e.g., physical access token 130A, physical access token 130B) storing a set of records including a first record comprising (a) a record identifier identifying the first record of the user and (b) a resource amount associated with the first record of the user.

In operation 224, input data may be transmitted. The input data may include a random seed value, a requested resource amount to the physical access token, or other input data. As described herein, responsive to receiving the input data, the physical access token may generate authentication data using data from the set of records stored on the physical access token and the input data transmitted in operation 224.

In operation 226, the authentication data (e.g., generated based on (i) the random seed value, (ii) the resource amount, (iii) the set of records stored at the physical access token, etc.) may be received from the physical access token.

In operation 228, a verification request may be transmitted for verifying the physical access token comprising the authentication data, the resource amount, and the random seed value. For example, the verification request may be transmitted to the remote server system, where a set of records corresponding to those of the physical access token is stored independently. Because the remote server system also has access to a corresponding set of records with the same data as those stored independently on the physical access token, the remote server system may generate reference data using the same inputs and its own set of records in the same way the physical access token can generate the authentication data. As such, the verification request is configured to include the same inputs as previously sent to the physical access token, as well as the generated authentication data for comparison.

In operation 230, in response to the verification indicating a match between the authentication data and the hash-based value derived from hashing of the combination of inputs, an indication of authorization may be received and may cause presentation of an authorization related to the resource amount. For example, the remote server system may identify a match as described herein and may subsequently transmit a signal configured to display to the user (e.g., owner of physical access token, authorized user of the physical access token) that the physical access token is successfully authorized.

Figure 3:
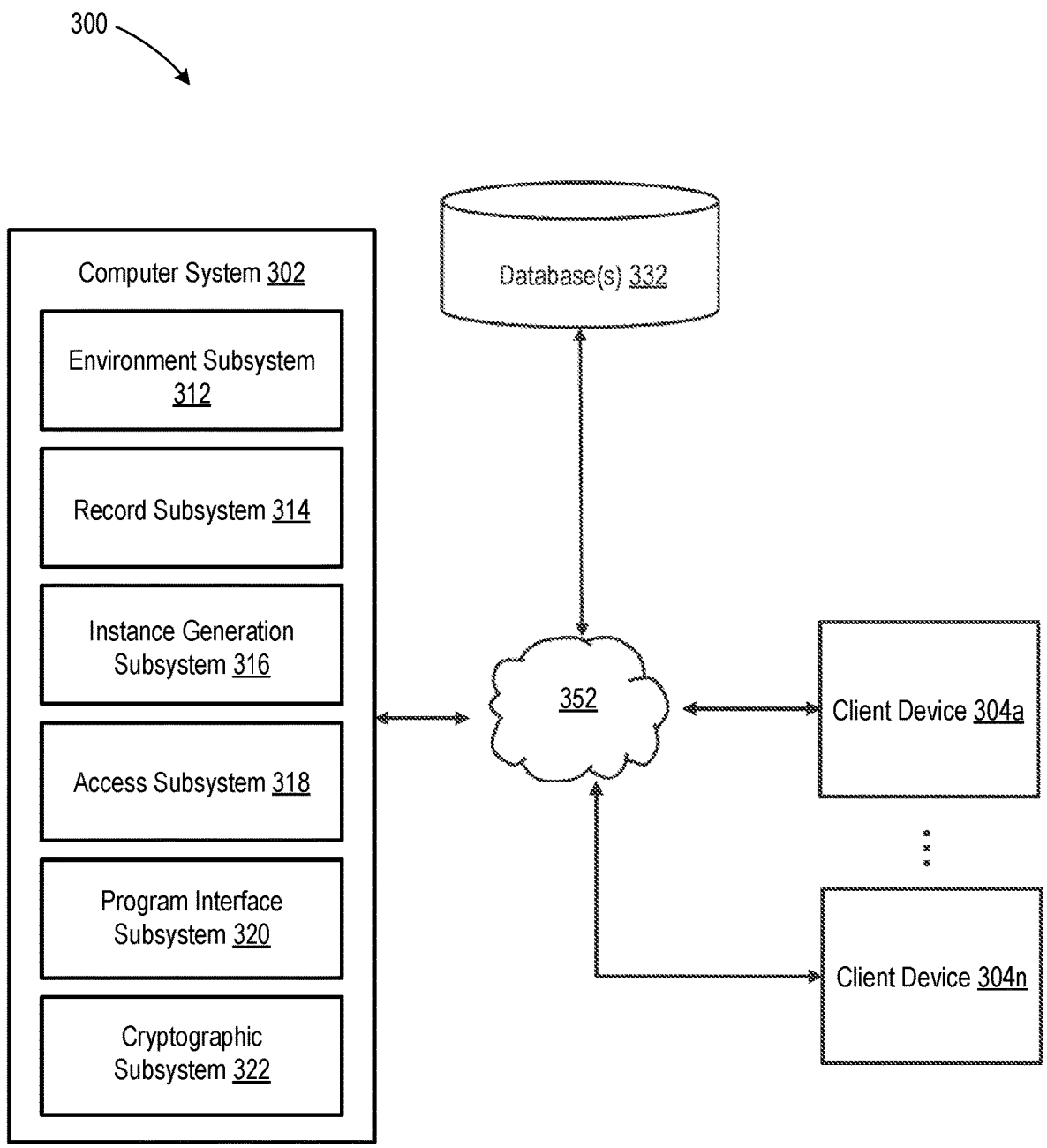
FIG. 3 shows a server system for facilitating resource allocation, in accordance with one or more embodiments.

FIG. 3 shows a system 300 for facilitating generation and modification of records, in accordance with one or more embodiments. According to some embodiments, system 300 is an exemplary remote server system, such as server system 150, or may be communicatively coupled to the remote server system. As shown in FIG. 3, system 300 may include computer system 302 (e.g., one or more servers, circuitry, one or more processors), client device 304 (or client devices 304a-304n), database 332 (e.g., bill pay database, transaction database, or other database for facilitating record management described herein), or other components (e.g., components described in U.S. patent application Ser. No. 15/833,660, filed on Dec. 6, 2017, or U.S. patent application Ser. No. 17/013,442, filed on Sep. 4, 2020, each of which is hereby incorporated herein by reference in its entirety). Computer system 302 may include environment subsystem 312, record subsystem 314 (e.g., record subsystem 156), instance generation subsystem 316, access subsystem 318, program interface subsystem 320, cryptographic subsystem 322 (e.g., cryptographic subsystem 154), or other components. Client device 304 may include any type of mobile terminal, fixed terminal, or other device. For example, the client device 304 may represent the access terminal, the user devices, or the physical access tokens described herein. By way of example, client device 304 may include a desktop computer, a notebook computer, a tablet computer, a smartphone, a wearable device (e.g., a virtual reality (VR)/augmented reality (AR) headset, eyewear, or other wearable device), POS system, stored value card, or other client device.

Users may, for instance, utilize one or more client devices 304 to interact with one another, one or more computer systems 302, or other components of system 300 to perform authorization for modifying records stored at the remote server system. It should be noted that while one or more operations are described herein as being performed by components of computer system 302, those operations may, in some embodiments, be performed by components of client device 304 or other components of system 300, and while one or more operations are described herein as being performed by components of client device 304, those operations may, in some embodiments, be performed by components of computer system 302 or other components of system 300.

As described herein, the system 300 may be enabled to generate and update records (e.g., responsive to verification of the physical access token). For example, the system 300 may access the relevant data or memory areas in which the relevant data is stored in order to generate the reference data to compare with authentication data from the physical token. Upon verification of the authentication data, the system may then update the records. In some examples, the completion of the record update triggers the removal or expiration of the entitlements. As an example, the application may modify first and second records associated with a user to reflect (i) a first transfer of at least some of a resource amount of the first record to the second record, (ii) a second transfer of at least some of a resource amount of the second record to one or more records associated with one or more users (e.g., other than the user), or (iii) other transfers (e.g., from other users' records to the second record, from the second record to the first record, etc.).

In some embodiments, system 300 may generate a second set of records associated with a user based on one or more records of a first set of records associated with the user (e.g., that are stored in a first memory area) and store the second set of records in one or more other memory areas. In some embodiments, the second set of records may be generated to include one or more records that are each a modified instance of a corresponding record of the first set. As an example, each such record (or record instance) of the second set may include a resource amount (or quantity) and a record identifier different from the record identifier of the corresponding record of the first set. Thus, because each record instance of the second set is different from the corresponding record of the first set, such data pertaining to the first set (e.g., its record identifiers) may not be derived from any bad actors that may intercept data transmitted by the application.

In some embodiments, record subsystem 314 may store records associated with users and manage updating of the records. In some embodiments, instance generation subsystem 316 may generate instances of one or more records stored in one or more storage areas (e.g., such as memory area 158) to enable (i) access to data of the records without necessarily enabling write access to the record data in the storage areas or (ii) access to data derived from the record data or other data related to the record data without enabling read or write access to the record data in the storage areas. As an example, the generated record instances may be exact copies of the records or modified instances of the records that are stored in one or more other storage areas.

In one use case, where a first set of records associated with a user is stored in a first storage area, a second set of records may be generated based on records of the first set such that each record of the second set is a modified instance of a corresponding record of the first set. In another use case, each record of the first set may include a record identifier, a resource amount (e.g., a quantity of a digital resource), a creation time (e.g., a creation date/time), a modification time (e.g., last modified date/time), one or more references to one or more associated records, or other data. A modified instance of a record of the first set may be generated (as part of the second set) based on the record of the first set such that the modified instance includes a record identifier different from the record identifier of the record of the first set. Additionally, or alternatively, a resource amount or other parameter value of the modified instance may be different from the resource amount or other parameter value of the record of the first set.

As an example, where records of the first set correspond to accounts of the user, the record identifiers of the records may be account identifiers of the accounts, and the resource amounts of the records may be an account balance (e.g., a current balance, an available balance, etc.). A modified instance of a record of the first set may be generated (as part of the second set) based on the record of the first set such that the modified instance includes an account identifier different from the account identifier of the record of the first set. In one scenario, as shown in Table 1 below, the account identifier (or one or more portions thereof) of the modified instance may be randomly generated (e.g., by executing one or more RdRand instructions and applying one or more seed values or via other pseudo-random generation) and associated with a creation time (e.g., a time at which the account identifier is generated, a time at which the new account instance is created, etc.) and one or more parameter values of the record of the first set. In a further scenario, the account identifier of the modified instance may additionally or alternatively be generated from a shared secret key (e.g., a key associated with the user, a key associated with the record set, etc.), the current time (e.g., the current date, the current date and hour, the current date and minute, or other current time measurement), or other input (e.g., the account identifier of the corresponding record of the first set). As an example, the shared secret key, the current time, and the account identifier of the record of the first set may be passed as inputs to an HMAC algorithm (e.g., HMAC-SHA1) or other algorithm to generate the account identifier of the modified instance. In another scenario, the account identifier of the modified instance may be a predefined identifier of a set of predefined identifiers associated with the user, and the modified instance may be generated to include the predefined identifier, one or more parameter values of the record of the first set, or other data.

TABLE 1

| Original Record | Modified Instance of the Record |
| --- | --- |
| Account Identifier: 6296911110 | Account Identifier: 8958205304 |
| Resource Amount: 8050 | Resource Amount: 8050 |
| Creation Time: Jan. 1, 2020 8:00 | Creation Time: Dec. 21, 2020 11:00 |
| [Other Parameter Values] | [Other Parameter Values] |

In some embodiments, access subsystem 318 may manage access controls associated with one or more users, one or more storage areas, one or more applications or system components, or data stored in the storage areas or related to the applications or system components. In some embodiments, access subsystem 318 may enable an application or system component to read from, write to, execute in one or more memory areas, or read or overwrite one or more data items (e.g., records, files, etc.) by modifying one or more access control lists associated with the memory areas or data items to specify which software processes (e.g., related to the application or system component) have access to the memory areas or data items and the type of access associated therewith.

In some embodiments, program interface subsystem 320 may include a communication subsystem capable of receiving data (e.g., requests from other devices) and can manage one or more application program interfaces (APIs) and facilitate routing and handling of API calls from one or more user applications located on one or more user devices or from one or more applications or system components located on one or more servers.

As described herein, the physical access token may be a stored value card, and the access terminal may be a POS system or other terminal at which the stored value card may be used to check balance, receive, or transmit value on the card. The access terminal may be used, for example, by a vendor or the user to modify records associated with accounts of the user or other users to reflect a transfer of resources between records (e.g., accounts). In some embodiments, the transfer process is uniquely designed to require "reciprocal corresponding transfer commands." As an example, when the physical access token is authenticated to enable modification of records reflecting a transfer of resources from a record to another record, such reciprocal corresponding transfer commands may be required to be performed by the user to fulfill the transfer (e.g., modification) from one record to the other record. In one use case, when a user initiates a transfer (e.g., performance of a transfer command), such as via the access terminal of digital resources (e.g., a certain resource quantity) from a record within a memory area associated with the user to another record therein, before the resources are allowed to move over into the other record, the user may be required to initiate a second transfer (e.g., performance of a second command) via the access terminal, such as in the form of a reciprocal corresponding transfer command for the other record to accept the resources into the other record. In one use case, where a first record corresponds to a first account of the user and a second record corresponds to a second account of the user, a transfer of funds (e.g., a quantity of a fiat currency, a transfer of a quantity of a cryptocurrency or other digital currency, or other resource amount) from the first account to the second account may require two commands from a user device or access terminal of the user-a first command directing a certain amount of funds out of the first account for transfer to the second account and a second command accepting the amount of the funds into the second account. In some embodiments, such reciprocal corresponding transfer commands are inextricably part of such a system, where the functionality is built into the system so that it may require a user to perform the foregoing commands to complete the transfer process.

In some use cases, the system may require the user to perform only a single user action (e.g., by selecting an option at the user device or remote server) to confirm the sending of both the first and second commands to effectuate the funds transfer from the first account to the second account. As an example, with respect to FIG. 5B, a user interface 520 of a display at the user device or access terminal may enable the user to tap or otherwise select (i) the "Accept" option 522 to cause the user device or access terminal to send both the first and second commands (e.g., to the remote server) to effectuate the funds transfer or (ii) the "Cancel" option 524 to cause the user application to go back to the prior screen (or go to another screen) without sending the first and second commands.

In other use cases, the system may require the user to perform two separate user actions (e.g., one for each of the first and second commands) via the user device or the access terminal to send the first and second commands to effectuate the funds transfer from the first account to the second account. In some use cases, the accounts may be any account types described in U.S. patent application Ser. No. 15/833,660, and the funds transfer may be effectuated as part of a set of funds transfers in connection with payment from a payer to a biller for a transaction involving one or more items scanned at a POS system (e.g., a system including components for ultraviolet disinfecting and identification, as described in U.S. patent application Ser. No. 17/013,442, or other POS system).

In some embodiments, record subsystem 314 may configure one or more memory areas or records to be enabled or disabled for one or more operations related to one or more user commands or other triggers. As an example, a first memory area (e.g., with a designation as a primary memory area or other designation) may be configured such that (i) resources may be transferred into the records in the first memory area (e.g., accounts corresponding to such records may be credited) and (ii) resources may be transferred out of the records in the first memory area (e.g., accounts corresponding to such records may be debited). A second memory area (e.g., with a designation as a secondary memory area or other designation) may be configured such that (i) resources may be transferred into the records in the second memory area and (ii) resources may not be transferred out of the records of the second memory area. In some use cases, the second memory area may be configured to enable the records in the second memory area to be updated to reflect such modifications (e.g., transfers into or out of a record) made to corresponding records in the first memory area. Additionally, or alternatively, one or more records of a user may be configured (e.g., as part of or independently of the assigned memory area) in one or more of the foregoing manners.

As another example, one or more of the foregoing memory areas or records may be configured such that transfers of resources into or out of a record associated with a user require one or more user commands from the user (e.g., a first user command for a transfer of resources out of a first record to a second record, a second user command for a transfer of resources into the second record from the first record, etc.), such as at an access terminal or via the user device. In one use case, such user commands may be required for both transfers of resources into and out of records within the same memory area associated with the user and transfers of resources into and out of records that are in different memory areas (e.g., memory areas associated with the same user but different sets of permissions or rules, memory areas associated with the same user but different hosting entities, memory areas associated with different users, etc.). In some use cases, such user commands may be required for transfers of resources into and out of records that are in different memory areas but may not be required for transfers of resources into and out of records that are in the same memory area.

As a further example, one or more of the foregoing memory areas or records may be configured such that one or more operations that would impact the memory areas or records are temporarily disabled (e.g., disabled for a fixed time period, disabled while one or more temporary conditions are determined to be present, etc.). In one use case, when a first set of operations related to a first transaction (e.g., involving a set of records) is in progress or has been initiated, a second set of operations related to a second transaction will be paused or prevented from being performed (e.g., to the extent that the set of operations involves one or more records of the same set of records) at least until the first set of operations is completed.

In some embodiments, in response to one or more user commands, access subsystem 318 may access one or more memory areas (or certain data therein) and may modify one or more records in the memory areas. As an example, the application may modify first and second records associated with a user to reflect (i) a first transfer of at least some of a resource amount of the first record to the second record, (ii) a second transfer of at least some of a resource amount of the second record to one or more records associated with one or more other users, or (iii) other transfers (e.g., from other users' records to the second record, from the second record to the first record, etc.). In some embodiments, the record subsystem 314 may generate a second set of records associated with the user based on the records of the first set. In some embodiments, the second set of records may be generated such that each of the records of the second set is a modified instance of a corresponding record of the first set. As an example, a record of the second set may be generated such that at least a record identifier of the generated record may be different from the record identifier of the corresponding record of the first set. Additionally, or alternatively, a resource amount or other parameter value of the generated record may be different from the resource amount or other parameter value of the corresponding record of the first set.

Figure 4A:
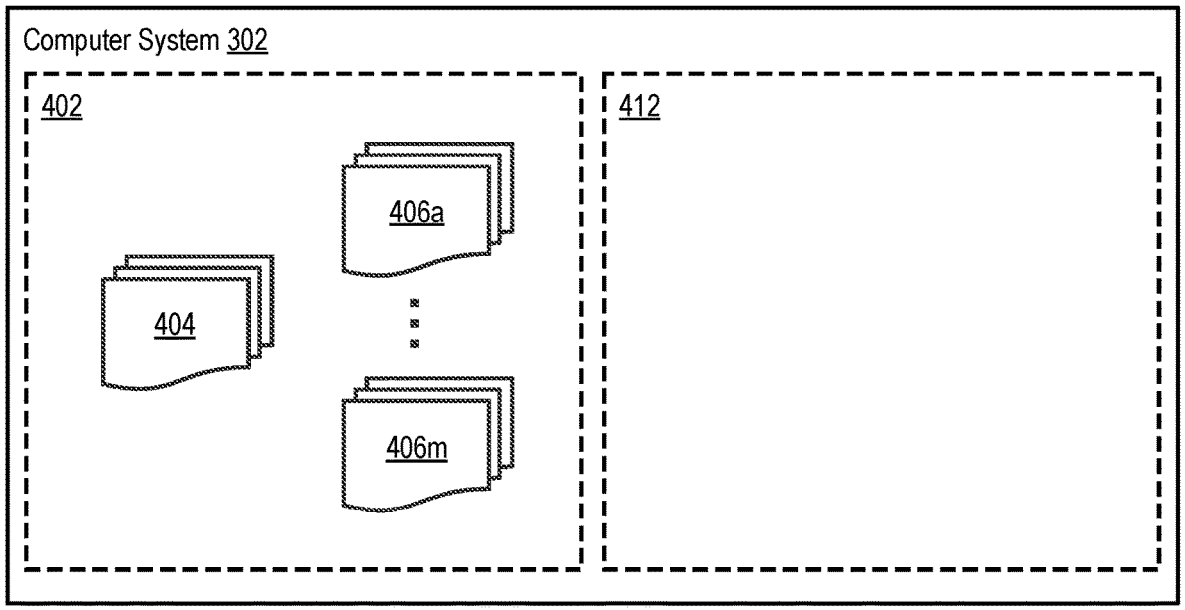
FIGS. 4A-4B show areas of a computer system and a set of records stored therein, in accordance with one or more embodiments.
Figure 4B:
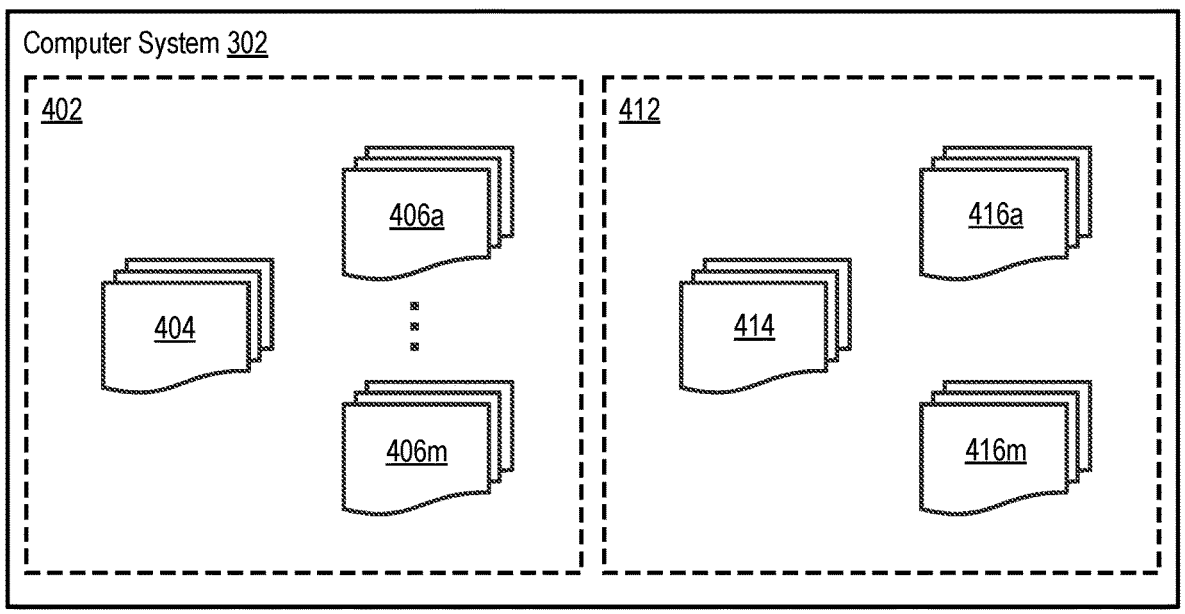

In one use case, with respect to FIG. 4A, memory area 402 may store the first set of records including records 404 and 406a-406m. In a further use case, with respect to FIG. 4B, in response to the command, the second set of records in memory area 412 including records 414 and 416a-416m may be generated based on records 404 and 406a-406m, respectively. As an example, record 414 of the second set may be a modified instance of record 404 of the first set, and records 416a-416m of the second set may be modified instances of records 406a-406m, respectively.

In some embodiments, in response to obtaining one or more commands from a user device of a user, cryptographic subsystem 322 may perform verification of authentication data in connection with the commands (e.g., as described in relation to FIGS. 1A-1B and FIGS. 2A-2C). As an example, prior to performance of one or more instructions indicated by the commands, cryptographic subsystem 322 may obtain the authentication data from the user device and perform the verification of the authentication data. The authentication data may include a token, a digital signature, instances of records (e.g., of a record set), or other data used to indicate that the user is an owner of the records of the record set or one or more resources related to the records.

Figure 5A:
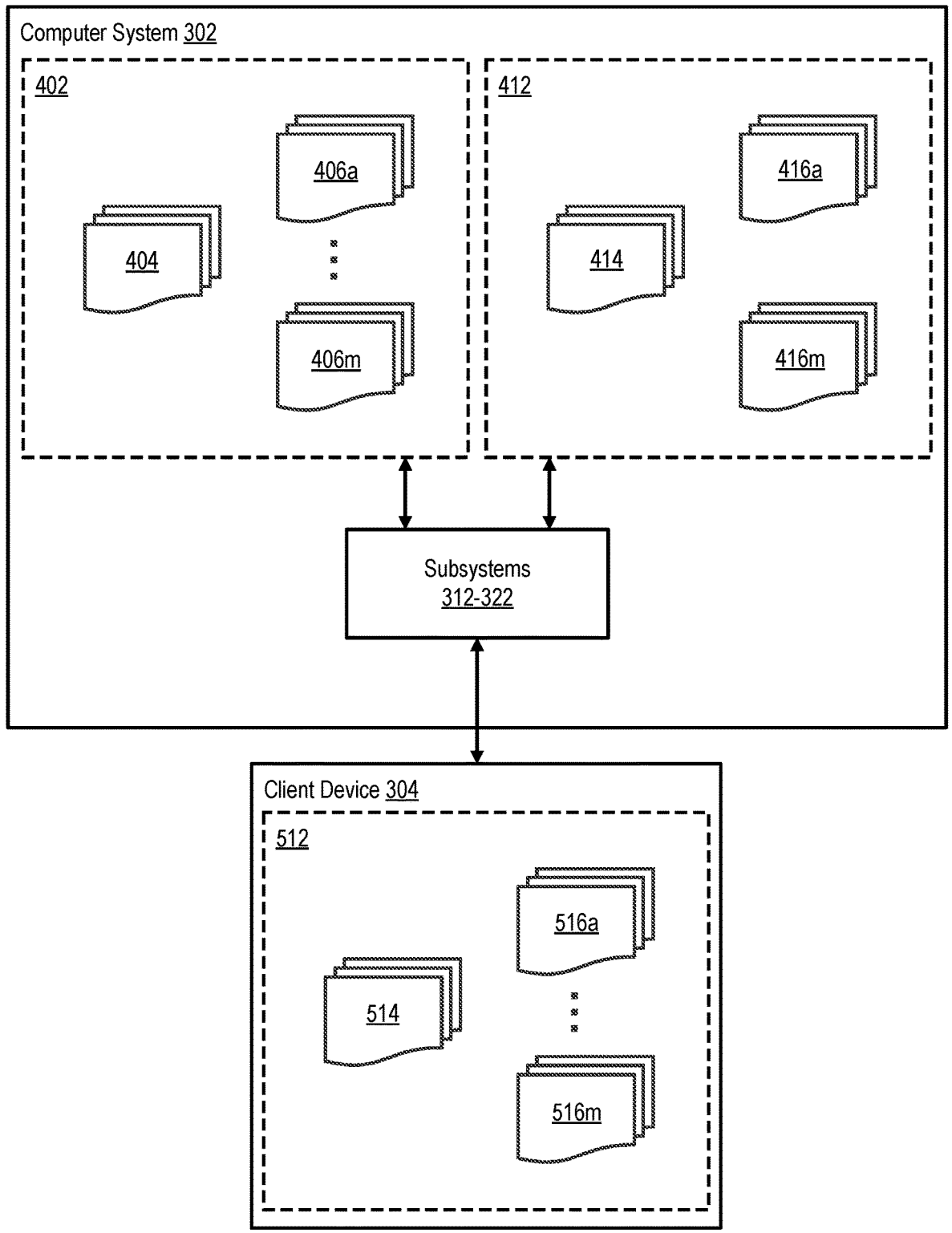
FIG. 5A shows a state of a computer system and a client device during a resource allocation triggered by the client device, in accordance with one or more embodiments.

In one use case, with respect to FIG. 5A, client device 304 (e.g., physical access token) may store one or more local copies 514 and 516a-516m of the records (e.g., records 404 and 406a-406m) in persistent storage of client device 304 (e.g., memory area 512 or other memory areas of client device 304), and client device 304 may generate the authentication data based on one or more portions of such local copies 514 and 516a-516m of the records. As an example, all the record identifiers of the local record copies 514 and 516a-516m may be combined in a specified order, the ordered combination may be provided as input to a one-way hash function, and the output of the hash function may be used to generate the authentication data. In one use case, an output hash value may be used as at least part of the authentication data, or the output hash value may be used in combination with other data to generate the authentication data. In another use case, the output hash value (or a data combination including the output hash value) may be encrypted using a private key (e.g., a key associated with the user, a key associated with the record set, etc.) to generate the authentication data.

In some embodiments, the validity of the authentication data may be based on whether the authentication data matches one or more records (or instances of the records) to which a request for access is related. As an example, with respect to Table 1 above, cryptographic subsystem 322 may determine whether the authentication data matches the original record, the instance of the record, or one or more records of the respective record set with which the original record or the instance is associated. If it is determined that a match exists, cryptographic subsystem 322 may determine that the authentication data is valid and enable the requested access. On the other hand, if it is determined that a match does not exist, cryptographic subsystem 322 may determine that the authentication data is invalid and decline the requested access.

In some embodiments, cryptographic subsystem 322 may perform the verification of the authentication data based on one or more records (or instances of the records) to which a request for access is related. In some embodiments, cryptographic subsystem 322 may generate a hash value related to one or more portions of the records (or instances of the records) and a reference value related to the authentication data, and the verification of the authentication data may be performed based on the hash value and the reference value. As an example, the verification may include comparing the hash value and the reference value to determine a similarity score. In one use case, the similarity score may be a binary score of TRUE (e.g., the hash value and the reference value are identical) or FALSE (e.g., the hash value and the reference value are not identical). A similarity score of TRUE may indicate that the authentication data is valid. A similarity score of FALSE may indicate that the authentication data is invalid.

In some embodiments, cryptographic subsystem 322 may hash one or more portions of the records (or instances of the records) to generate the hash value of the record portions. As an example, all the record identifiers of the records (or the instances of the records) may be combined in a specified order, and the ordered combination may be provided as input to a one-way hash function to output the hash value. As another example, all the record identifiers and the resource amounts of the records (or instances thereof) may be combined in a specified order, and the ordered combination may be provided as input to a one-way hash function to output the hash value. Additionally, or alternatively, one or more other parameter values of the records (or instances thereof) may be combined as part of the ordered combination used to generate the hash value.

In some embodiments, cryptographic subsystem 322 may obtain a public key that is part of a public/private key pair (associated with a private key used to generate the authentication data) and use the public key to decrypt the authentication data to generate the reference value.

In some embodiments, environment subsystem 312 may create and manage one or more environments in which one or more applications execute and operate. Such environments may include one or more memory areas in which the applications are installed and application data and other data accessible to the applications are stored.

In some embodiments, in response to modification of one or more records in a given memory area, record subsystem 314 may update one or more corresponding records in a corresponding memory area to reflect the modification of the records in the given memory area. As an example, where the modification is made to effectuate a transfer of at least some of a resource amount of a first record in a first memory area to a second record in the first memory area, the corresponding records in a second memory area may be updated to reflect the transfer. As another example, where the modification is made to effectuate a transfer of at least some of a resource amount of a first record in the second memory area to a second record in the second memory area, the corresponding records in the first memory area may be updated to reflect the transfer.

In some embodiments, in response to completing the update of the corresponding records in the first or second memory area, environment subsystem 312 may perform a reset of the other memory area (storing the records modified by the application) to one or more default settings. As a further example, the reset may cause the modified records to be deleted from the other memory area. In one use case, for example, the other memory area may be reformatted, thereby erasing all data pertaining to the records from the other memory area.

In some embodiments, where the first memory area is initially designated as a primary memory area (or part of the primary memory area) associated with the user, and the second memory area is initially designated as a secondary memory area (or part of the secondary memory area), record subsystem 314 may modify one or more such designations to reflect the current state. As an example, where the records in the first memory area are deleted (or the first memory area is reset) (e.g., in favor of the corresponding record instances in the second memory area), the second memory area may be designated as the primary memory area (or part of the primary memory area) associated with the user (e.g., to indicate the record instances in the second memory area as the current state of the user's records). In some use cases, the first memory area may be designated as the secondary memory area (or part of the secondary memory area). In some use cases, when such designation is updated for a memory area, the memory area may be configured with permissions or rules subject to such designation. As an example, when designated as a primary memory area, the memory area may be configured such that (i) resources may be transferred into the records in the memory area (e.g., accounts corresponding to such records may be credited) and (ii) resources may be transferred out of the records in the memory area (e.g., accounts corresponding to such records may be debited). When designated as a secondary memory area, the memory area may be configured such that (i) resources may be transferred into the records in the memory area and (ii) resources may not be transferred out of the records of the memory area.

In some embodiments, where one or more records stored in a given memory area are modified by an application in response to either (1) establishing connection between the physical access token or (2) obtaining one or more commands from a user device or access terminal for initiating the transfer (e.g., modification of the records), cryptographic subsystem 322 may obtain authentication data from the user device or physical access token and perform verification of the authentication data. As an example, the user device or physical access token (e.g., a client device 304) may store an instance of a first set of records (e.g., stored in a first memory area associated with computer system 302), and the user device or physical access token may generate an updated instance of the first set of records reflecting first and second transfers in connection with transmitting one or more commands directing such transfers (e.g., a transfer of at least some of the resource amount of a first record of the first set of records to a second record of the first set of records, a transfer of at least some of the resource amount of the second record to one or more records associated with one or more users, etc.). The user device or physical access token may generate the authentication data based on one or more portions of records of the updated instance set stored at the user device and transmit the authentication data to computer system 302 to enable computer system 302 to confirm the current updated state of corresponding records stored by computer system 302. As another example, the authentication data may include a token, a digital signature, instances of records of the updated instance set stored at the user device or physical access token, or other data used to confirm whether the current updated state of corresponding records stored by computer system 302 matches the records of the updated instance set (or record data thereof) stored at the user device or physical access token.

In one use case, with respect to FIG. 5A, client device 304 (e.g., user device or physical access token) may store one or more local copies 514 and 516a-516m of the records of the first set of records (e.g., records 404 and 406a-406m). In connection with transmitting one or more commands directing a modification (e.g., a resource allocation or other modification) related to the first set of records, client device 304 may generate an updated instance of the first set of records reflecting such modification. Client device 304 may then use one or more portions of records of the updated instance set to generate the authentication data and transmit the authentication data to computer system 302.

As an example, to generate the updated instance of the first set of records, client device 304 (e.g., the user device or physical access token) may update the local copies 514 and 516a-516m to reflect the modification in accordance with the commands. As another example, client device 304 may generate a modified instance for each record of the local copies 514 and 516a-516m (e.g., via one or more techniques described herein) such that the modified record instance includes a record identifier different from the record identifier of the record of the first set copies. Each such modified record instance may be generated/updated to reflect the modification in accordance with the commands. In one scenario, the record identifier of the modified record instance may be generated from a shared secret key (e.g., a key associated with the user, a key associated with the record set, etc.), the current time (e.g., the current date, the current date and hour, the current date and minute, or other current time measurement), or other input (e.g., the record identifier of the corresponding record of the first set copies). In a further scenario, the shared secret key, the current time, and the record identifier of the record of the first set copies may be passed as inputs to an HMAC algorithm (e.g., HMAC-SHA1) or other algorithm to generate the record identifier of the modified record instance.

As another example, to generate the authentication data, all the record identifiers of the records of the instance set (e.g., the updated local copies 514 and 516a-516m, record instances of the updated local copies 514 and 516a-516m, etc.) may be combined in a specified order, the ordered combination may be provided as input to a one-way hash function, and the output of the hash function may be used to generate the authentication data. As another example, an output hash value may be used as at least part of the authentication data, or the output hash value may be used in combination with other data to generate the authentication data. As another example, the output hash value (or a data combination including the output hash value) may be encrypted using a private key (e.g., a key associated with the user, a key associated with the record set, etc.) to generate the authentication data.

In a further use case, computer system 302 may use the authentication data to determine whether the first set of records or a corresponding set of records (e.g., records 404 and 406a-406m or records 414 and 416a-416m as modified or otherwise updated in connection with the commands from the user device) matches the updated instance set stored at the user device. As an example, computer system 302 may use the authentication data to confirm whether one or more portions of records of the first set of records (e.g., records 404 and 406a-406m as modified or otherwise updated in connection with the commands from the user device) are the same as one or more portions of records of the updated instance set stored at the user device (e.g., the same record identifiers, the same resource amounts, the same creation times, etc.). Likewise, as another example, computer system 302 may use the authentication data to confirm whether one or more portions of records of the corresponding set of records (e.g., records 414 and 416a-416m as modified or otherwise updated in connection with the commands from the user device) derived from the first set of records are the same as one or more portions of records of the updated instance set stored at the user device (e.g., the same record identifiers, the same resource amounts, the same creation times, etc.).

In some embodiments, where the commands from the user device direct (i) a first transfer of at least some of the resource amount of the first record of the first set of records to the second record of the first set of records and (ii) a transfer of at least some of the resource amount of the second record to one or more records associated with one or more users, cryptographic subsystem 322 may perform verification of the authentication data (obtained from the user device) prior to performing deletion of the first set of records from the first memory area (or corresponding records in a corresponding memory area associated with computer system 302), a reset of the first memory area (or a corresponding memory area associated with computer system 302), or one or more other operations. As an example, the deletion, reset, or other operations may be performed in response to the verification indicating a match between the relevant set of records at computer system 302 and the updated instance set at the user device. As another example, the deletion, reset, or other operations may not be performed in response to the verification indicating a lack of a match between the relevant set of records at computer system 302 and the updated instance set at the user device. In one scenario, where there is a lack of a match, an error may be returned to the user device, and the user device may revert its record state to the prior instance set (e.g., by reverting any changes, by deleting the updated instance set and setting or maintaining the original instance set as the current state, etc.). Likewise, in a further scenario, similar operations may be performed at computer system 302 with respect to the first set of records or a corresponding set of records derived from the first set of records at computer system 302.

In some embodiments, verification of the authentication data may include generating a hash value related to one or more portions of the records (of the first set of records or the corresponding set of records) and a reference value related to the authentication data and then comparing the hash value and the reference value to determine a similarity score. In one use case, the similarity score may be a binary score of TRUE (e.g., the hash value and the reference value are identical) or FALSE (e.g., the hash value and the reference value are not identical). A similarity score of TRUE may indicate a match between the relevant set of records at computer system 302 and the updated instance set at the user device. A similarity score of FALSE may indicate a lack of a match between the relevant set of records at computer system 302 and the updated instance set at the user device.

In some embodiments, cryptographic subsystem 322 may hash one or more portions of the records to generate the hash value of the record portions. As an example, all the record identifiers of the records may be combined in a specified order, and the ordered combination may be provided as input to a one-way hash function to output the hash value. As another example, all the record identifiers and the resource amounts of the records (or instances thereof) may be combined in a specified order, and the ordered combination may be provided as input to a one-way hash function to output the hash value. Additionally, or alternatively, one or more other parameter values of the records (or instances thereof) may be combined as part of the ordered combination used to generate the hash value. In some embodiments, crypto-graphic subsystem 322 may obtain a public/private key and generate the reference value based on the authentication data and the key (e.g., a key associated with the user, a key associated with the respective record set, etc.). As an example, cryptographic subsystem 322 may obtain a public key that is part of a public/private key pair (associated with a private key used to generate the authentication data) and use the public key to decrypt the authentication data to generate the reference value.

In some embodiments, a server system (e.g., computer system 302) may store a first set of records associated with a user in a first memory area, and a user device (e.g., client device 304) of the user may store a local instance of the first set of records. In response to the user device sending one or more commands to the server system, the server system may modify one or more records of the first set (or one or more other records) in accordance with the user commands. As an example, the commands may direct (i) a transfer of a resource amount of a first record of the first set to a second record of the first set, (ii) acceptance of the resource amount into the second record from the first record, (iii) a transfer of another resource amount of another record to one or more records, (iv) an acceptance of the other resource amount into one or more records from the other record, or (v) other operations. The server system may thus modify the records of the first set (or the other records) to reflect or represent such transfers, acceptances, or other operations.

Prior to performing the modification, the server system may obtain and perform verification of authentication data from the user device (e.g., to ensure that the user is the owner of the accounts corresponding to the records to be modified). In response to determining that the authentication data is valid, the server system may modify the records of the first set in accordance with the user commands. As an example, the validity of the authentication data may demonstrate that the user device has one or more data items that only the user (or only the user and an entity hosting the user's corresponding accounts) should have, such as (i) copies of records of the first set of records stored in the first memory area of the server system, (ii) a particular private key (e.g., a key associated with the user, a key associated with the record set, etc.), or (iii) other data items.

In response to the user commands and determining that the authentication data is valid, the server system may generate/update a second set of records associated with the user in a second memory area of the server system based on records of the first set such that each record of the second set (i) is a modified instance of a corresponding record of the first set and (ii) includes a record identifier different from the record identifier of the corresponding record of the first set. As an example, where the second set of records is generated or updated to reflect the foregoing transfers, acceptances, or other operations (that are directed by the user commands), each record (or record instance) of the second set may include the same resource amount as the corresponding record of the first set, even though the record instance of the second set may include a different record identifier than the corresponding record of the first set.

In some embodiments, the user device may likewise generate/update another set of records based on the local instance of the first set of records stored on the user device such that each record of the generated/updated set (i) is a modified instance of a corresponding record of the first set and (ii) includes a record identifier different from the record identifier of the corresponding record of the first set. As with the second set of records at the server system, each such modified record instance may be generated/updated to reflect the foregoing transfers, acceptances, or other operations (that are directed by the user commands). Both the server system and the user device may employ the same techniques to generate the second set of records and the modified record instances, respectively, to have the same data (e.g., the same record identifiers, the same resource amounts, etc.; see Table 2 below) without needing to share such data with one another or otherwise transmit such data outside their respective secure locations. As an example, in one scenario, both the server system and the user device may generate the record identifier of their respective modified record instance from a shared secret key, the current time, or other input (e.g., the record identifier of the corresponding record of the first set). In a further scenario, both the server system and the user device may pass the shared secret key, the current time, and the record identifier of the record of the first set copies as inputs to an HMAC algorithm to generate the record identifier of the modified record instance (e.g., where the shared secret key is used to the form the "seed," and the current time and the record identifier are used to form the "message").

TABLE 2

| Records at Server and User Device | Modified Instances at Server and User Device |
| --- | --- |
| Record A: | Record A': |
| Account Identifier: 6296911110 | Account Identifier: 8958205304 |
| Resource Amount: 7020 | Resource Amount: 7020 |
| [Other Parameter Values] | [Other Parameter Values] |
| Record B: | Record B': |
| Account Identifier: 3465215782 | Account Identifier: 8752452468 |
| Resource Amount: 0 | Resource Amount: 0 |
| [Other Parameter Values] | [Other Parameter Values] |
| . . . | . . . |

In some embodiments, the server system may obtain and perform verification of authentication data from the user device to confirm that the server system and the user device or physical access token have the same updated records. As an example, the validity of the authentication data may demonstrate that the modified record instances generated by the user device or physical access token are the same as the records of the second set of records generated by the server system. In this way, for example, where the modified record instances are later used by the user device or physical access token to generate its authentication data (e.g., to demonstrate that the user is the owner of the accounts corresponding to the records to be modified), the foregoing confirmation process may ensure that the user can use the user device or physical access token to perform modifications or other operations with respect to the records at the server system.

In some embodiments, with respect to generation of the authentication data, the user device or physical access token may combine all the record identifiers of the modified record instances, provide the ordered combination as input to a one-way hash function, and use the output of the hash function to generate the authentication data. As another example, an output hash value may be used as at least part of the authentication data, or the output hash value may be used in combination with other data to generate the authentication data. As another example, the output hash value (or a data combination including the output hash value) may be encrypted using a private key (e.g., a key associated with the user, a key associated with the record set, etc.) to generate the authentication data.

The server system may perform verification of the authentication data by generating a hash value related to one or more portions of the records (of the second set of records) and a reference value related to the authentication data and then perform comparing the hash value and the reference value to determine a similarity score. In one use case, the similarity score may be a binary score of TRUE (e.g., the hash value and the reference value are identical) or FALSE (e.g., the hash value and the reference value are not identical). A similarity score of TRUE may indicate a match between the relevant set of records at the server system and the modified record instances generated by the user device or physical access token, thereby indicating that the authentication data is valid. A similarity score of FALSE may indicate a lack of a match between the relevant set of records at the server system and the modified record instances generated by the user device or physical access token, thereby indicating that the authentication data is invalid.

In some embodiments, in response to determining that the authentication data is valid (e.g., confirming that the server system and the user device or physical access token have the same updated records), the server system may designate the second set of records as a primary set of records for the user (e.g., in lieu of the first set of records being the primary set of records). The user device or physical access token may likewise designate the modified record instances as a primary set of records for the user at the user device or physical access token (e.g., in lieu of the prior copies of the first set of records being the primary set of records for the user at the user device or physical access token). Additionally, or alternatively, in response to determining that the authentication data is valid, the server system may remove the first set of records from the first memory area (e.g., by deleting the first set of records or moving the first set of records to an archive database or other storage area) and move the second set of records into the first memory area (e.g., to replace the first set of records). As a further example, the server system may reformat the first memory area, thereby erasing all data pertaining to the first set from the first memory area.

Figure 5B:
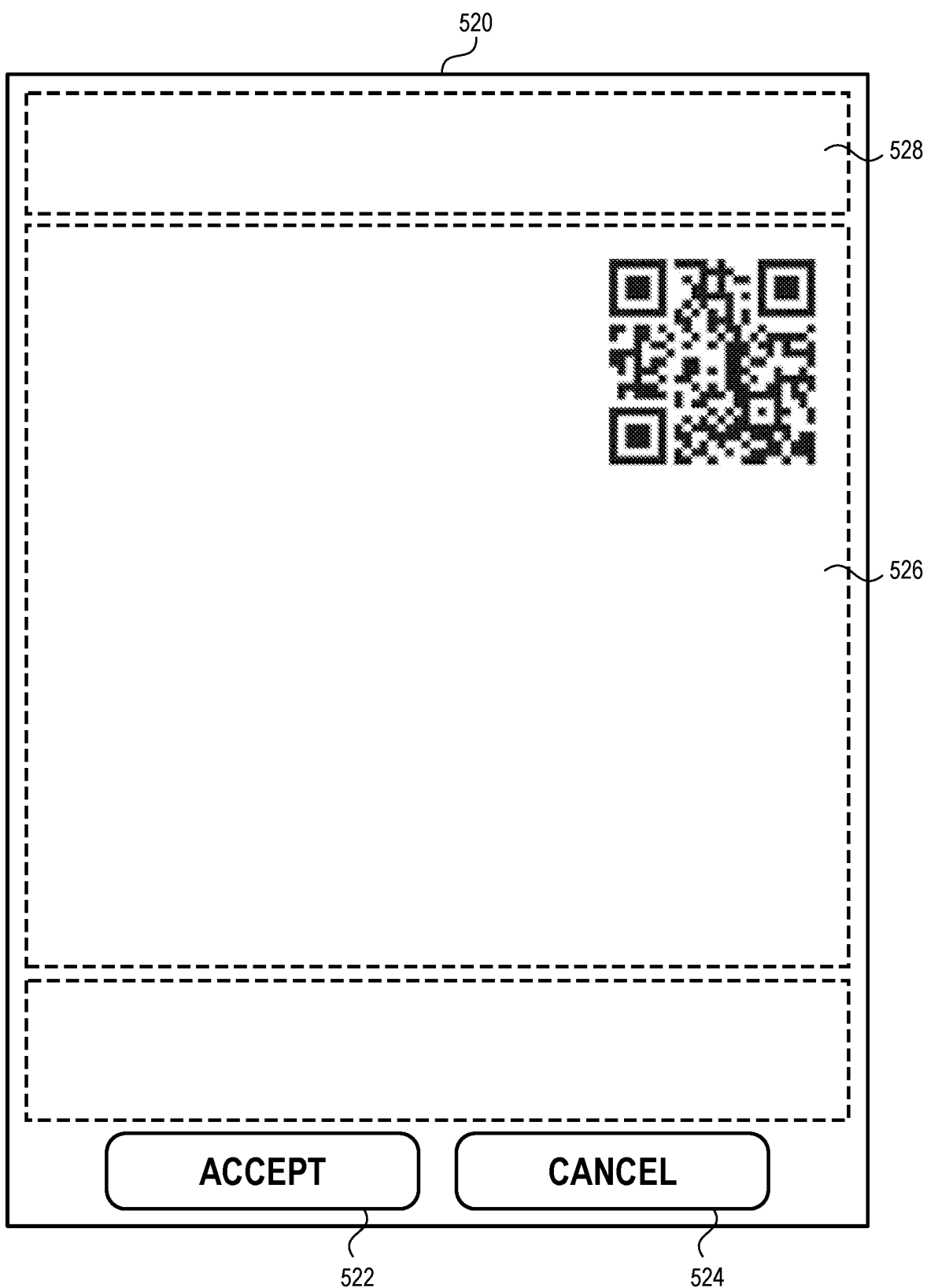
FIG. 5B shows a user interface that enables a user to initiate one or more user commands related to one or more records, in accordance with one or more embodiments.

In one use case, with respect to FIG. 5B, when the quick response (QR) code (or other code type) (shown in FIG. 5B) at an access terminal, such as a POS, is captured by a camera (or other data capture device) of a user device, the user device may process the QR code to obtain data related to the QR code (e.g., data represented by the QR code, data accessible via a hyperlink represented by the QR code, etc.) and present at least some of the related data on one or more areas 526 or 528 of the user interface 520. The related data may include instructions on where resources are to be directed (e.g., from an account of the user to another account of the user, from an account of the user to an account of one or more other users, etc.), the purchase data shown in Table 3 below, or other data. The user device may, for example, present the purchase data in area 526 without presenting any or all of the data pertaining to the instructions on where the resources are to be directed (e.g., potentially sensitive information such as full account identifiers may not be shown). If the user selects the "Accept" option 522, the user device or access terminal may send two or more commands to a server system to effectuate the funds transfer related to the purchase data shown in Table 3 below, such as a first command directing a certain amount of funds out of a first account of the user for transfer to a second account of the user, a second command accepting the amount of the funds into the second account, and a third command directing the amount (or another amount) of the funds out of the second account for transfer to one or more accounts of the biller. In some use cases, in lieu of the user selection of the "Accept" option 522, the user device or access terminal may be preconfigured to automatically send the user commands in response to the user device scanning the QR code and obtaining the related QR code data (e.g., sending the user commands without requiring the user to indicate any transfer amounts or payees subsequent to the QR code scan).

TABLE 3

Purchase: Jan. 31, 2021 at 12:15 p.m.
Point of Sale Biller
Store Number: 520

| | |
|---|---:|
| Ream of Paper | $ 5.00 |
| Pens | $ 1.00 |
| Ink Cartridge | $30.00 |
| Stapler | $27.00 |
| Subtotal | $63.00 |
| Tax | $ 6.00 |
| Total | $69.00 |

In response to obtaining the user commands from the user device, the server system may perform authentication of the physical access token and, as such, authentication of the user (e.g., to ensure that the user is the owner of the accounts out of which funds are transferred). As an example, the server system may use the user commands to identify a first set of records (e.g., stored in a first memory area at the server system) that corresponds to the accounts of the user and perform the authentication by confirming that the user device or physical access token already has a local copy of the first set of records (e.g., without requiring any portion of the first set of records to be sent from the server system to the user device or any portion of the local copy to be sent from the user device or physical access token to the server system).

In response to the user commands (e.g., at the access terminal) and the authentication being successful, the server system may modify the records of the first set in accordance with the user commands (e.g., modifying the records to reflect or represent transfers, acceptances, or other operations that are directed by the user commands). The user device or physical access token may also modify its local instance of the records of the first set to reflect or represent transfers, acceptances, or other operations that are directed by the user commands. Additionally, or alternatively, the server system may generate/update a second set of records associated with the user (e.g., in a second memory area of the server system) based on records of the first set such that each record of the second set (i) is a modified instance of a corresponding record of the first set and (ii) includes a record identifier different from the record identifier of the corresponding record of the first set. As an example, where the second set of records is generated or updated to reflect the foregoing transfers, acceptances, or other operations (that are directed by the user commands), each record (or record instance) of the second set may include the same resource amount as the corresponding record of the first set, even though the record instance of the second set may include a different record identifier than the corresponding record of the first set.

The user device or physical access token may likewise generate/update another set of records based on the local instance of the first set of records stored on the user device or physical access token such that each record of the generated/updated set (i) is a modified instance of a corresponding record of the first set and (ii) includes a record identifier different from the record identifier of the corresponding record of the first set. As with the second set of records at the server system, each such modified record instance may be generated/updated to reflect the foregoing transfers, acceptances, or other operations (that are directed by the user commands). Both the server system and the user device or physical access token may employ the same techniques to generate the second set of records and the modified record instances, respectively, to have the same data (e.g., the same record identifiers, the same resource amounts, etc.; see Table 2 above) without needing to share such data with one another or otherwise transmit such data outside their respective secure locations. As an example, in one scenario, both the server system and the user device or physical access token may generate the record identifier of their respective modified record instances from a shared secret key, the current time, or other input (e.g., the record identifier of the corresponding record of the first set).

The server system may perform a confirmation process to ensure that the server system and the physical access token have the same updated records (e.g., without requiring any portion of the updated records to be sent to/from the server system from/to the physical access token). As an example, the confirmation process may demonstrate that the modified record instances generated by the physical access token are the same as the records of the second set of records generated by the server system. In this way, for example, the physical access token may subsequently use the modified record instances (stored at the physical access token or, in some examples, on the user device) to authenticate a subsequent transaction involving the accounts corresponding to the modified record instances.

In response to confirming that the server system and the physical access token have the same updated records, the server system may designate the second (e.g., new) set of records as a primary set of records for the user (e.g., in lieu of the first set of records being the primary set of records). The physical access token may likewise designate the modified record instances as a primary set of records for the user at the physical access token (e.g., in lieu of the prior copies of the first set of records being the primary set of records for the user at the physical access token).

In some use cases, the foregoing operations after the physical access token and the access terminal establish a connection (e.g., operations related to the authentication, record modification/update, confirmation, designation, record deletion or movement, etc.) may be performed automatically by the server system, access terminal, and the physical access token without receiving user input. In other use cases, before the modified record instances are designated as a primary set of records for the user (or replace their respective original records), the remote server system may require the user to manually "accept" the results (e.g., via a display on the access terminal or user device hosting or communicatively coupled to the physical access token).

With respect to FIG. 5B, for example, the user may be presented with the purchase data shown in Table 3 above, and the user may be required to either accept or reject the results by selecting the "Accept" option 522 or the "Cancel" option 524 (e.g., at the access terminal or on the screen of the user device). If the user selects the "Accept" option 522, the access terminal or user device may send a command to the server system directing the designation or replacement operations, causing the server system to perform such operations in response to the user selection (e.g., thereby designating the modified record instances as representing the current state of the user's accounts). As another example, if the user selects the "Cancel" option 524, the remote server or user device may send a user command to the server system to roll back the operations that occurred pursuant to the initial user commands, and the server system may perform such rollback operations in response to the user selection.

In some use cases, even if the respective "original" records are deleted or moved (e.g., to an archive database or area), data of the original records may be mapped to the user (e.g., via a user identifier of the user; also referred to herein as a primary identifier) or the records representing the current state of the user's accounts. As an example, with respect to Table 2 above, even if Records A and B corresponding to account identifiers "6296911110" and "3465215782" are no longer updated (e.g., as a result of being deleted or moved), the server system may maintain historical data (e.g., in database 332) that links the two account identifiers (or other parameter values of Records A and B) to the user or, respectively, to the new Records A' and B' corresponding to account identifiers "8958205304" and "8752452468." As another example, such historical data may be stored in association with the user or, respectively, with the new Records A' and B' in a profile of the user in a historical database or other area related to the server system. As such, when the prior account identifiers or data (e.g., corresponding to Records A and B) is available, they may be used to facilitate receipt of funds (e.g., refunds or other receipt of funds), accounting, or other operations. With respect to refunds, for example, a directory or other component of the server system may use the historical data to apply a refund specified for Record A or B to Record A' or B', respectively.

In a further use case, the data of each of the original records and its corresponding record (representing the current state of the corresponding account) may be mapped to another record identifier (e.g., a master account identifier, other primary identifier, etc.), which can be used to determine the corresponding current-state record from the original record (or vice versa). As an example, with respect to Table 2 above, the server system may store a first master account identifier in association with Records A and A' (or their respective account identifiers "6296911110" and "8958205304") in a database. Additionally, or alternatively, the server system may store a second master account identifier in association with Records B and B' (or their respective account identifiers "3465215782" and "8752452468") in the database, and so on. The foregoing association, for example, may be used by a directory or other component of the server system to facilitate receipt of funds (e.g., refund or other receipt of funds), generation of reports, or other operations (e.g., operations involving linking of corresponding accounts with one another).

As another example, when a refund (or other receipt of funds) is directed to the account identifier "3465215782" (of Record B) after Record B has been replaced by Record B' (or archived, deleted, designated as a secondary record, etc., in favor of Record B'), the server system may perform a query with the account identifier of Record B to determine the account identifier "8752452468" (of Record B'). In one scenario, upon receipt of the account identifier of Record B as part of the query, a database may return the second master account identifier associated with Record B, and the server system may perform another query with the second master account identifier (e.g., at the same database or a different database) to obtain the account identifier of Record B'. In another scenario, upon receipt of the account identifier of Record B as part of the query, the database may use the account identifier of Record B to retrieve the second master account identifier associated with Record B and subsequently use the second master account identifier to retrieve and return the account identifier of Record B'. Upon receipt of the account identifier of Record B', the server system may use the account identifier of Record B' to transfer the funds associated with the refund to the account corresponding to Record B'.

As a further example, where the funds (or at least a portion thereof) associated with the refund were previously transferred from Record A to Record B (e.g., from/to their respective corresponding accounts associated with the same user) and then from Record B to a record of another user, the refund operations may result in the funds being transferred to Record B', as discussed above. In one scenario, the server system may automatically transfer the funds to Record A' or one or more other records associated with the user (e.g., based on a determination that the funds initially originated from the corresponding Record A or other records corresponding to the records to which the funds are automatically transferred). Such automatic transfer may be performed by the server system without the user directing the transfer (e.g., after the refund was received) or may be based on a predesignation by the user prior to the receipt of the refund to allocate such refund to Record A' or the other records. In another scenario, the funds may remain at the account corresponding to Record B' until the user performs one or more commands to transfer funds from Record B' to Record A' (or from Record B' to another record associated with the user or another user) (e.g., via performance of "reciprocal corresponding transfer commands" or other commands by the user).

In some embodiments, with respect to a financial system, a bill pay database or other components of such system may store and use the foregoing mappings to facilitate chargebacks, reversals, refunds, or other financial transactions or other activities that relate to prior operations. For example, should a chargeback be initiated for a transaction originally associated with Record C, for which resources have been updated to be located on Record C', the system may use its historical mapping to accurately process the chargeback against the current Record C', ensuring that the refund adjustments reflect accurately in the user's current account status. In one use case, the bill pay database may involve a database architecture that supports a layered mapping strategy that not only links old and new records via primary or master account identifiers, but also maintains a detailed transaction history for each account. The transaction history may include timestamps, transaction types (e.g., payment, refund, chargeback, etc.), account identifiers, or other information associated with the transactions.

In another use case, in the case of inter-account transactions within the same user profile where funds are transferred from one account to another (e.g., from Record D to Record E, and subsequently to a third party)—the mappings stored in the bill pay database may be used to ensure that any refunds or reversals are correctly applied to the chain of transactions. If a refund is issued for a transaction originating from Record D, now updated as Record D', but the funds had moved through several accounts, the system's mapping logic will ensure that the refund is appropriately allocated (e.g., by reverting the funds back through the transaction chain or by applying the user's predefined allocation preferences). As an example, the original transaction is dynamically mapped to the new account record, ensuring that the transaction history remains intact and accessible. As indicated above, such dynamic mapping is particularly useful in scenarios where users or systems need to initiate refunds or rollbacks based on transactions that occurred on now-inactive or updated accounts. Moreover, the system helps ensure that transactions, funds, or other resources are accurately mapped, regardless of the changes to the account records.

In some embodiments, the system (e.g., via the bill pay database) may be designed to support complex financial operations that involve multiple steps or stages. For example, in situations where a refund needs to be processed for a transaction that spanned multiple accounts (e.g., due to charges being split or transferred across accounts belonging to the same user or even different users), the system can automatically identify and execute the appropriate refunds or transfers (e.g., based on a combination of user-defined rules and automated logic embedded within the database's operation protocols).

In some embodiments, the various computers and subsystems illustrated in FIG. 3 may include one or more computing devices that are programmed to perform the functions described herein. The computing devices may include one or more electronic storages (e.g., database(s) 332 or other electronic storages), one or more physical processors programmed with one or more computer program instructions, circuitry, or other components. The computing devices may include communication lines or ports to enable the exchange of information within a network (e.g., network 352) or other computing platforms via wired or wireless techniques (e.g., Ethernet, fiber optics, coaxial cable, Wi-Fi, Bluetooth, NFC, or other technologies). The computing devices may include a plurality of hardware, software, or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., electrically erasable programmable read-only memory (EEPROM), random-access memory (RAM), etc.), solid-state storage media (e.g., flash drive, etc.), or other electronically readable storage media. The electronic storages may include one or more virtual storage resources (e.g., cloud storage, a virtual private network, or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 312-322 or other subsystems (or components described in U.S. patent application Ser. No. 15/833,660, filed on Dec. 6, 2017, or U.S. patent application Ser. No. 17/013,442, filed on Sep. 4, 2020, each of which is hereby incorporated herein by reference in its entirety). The processors may be programmed to execute computer program instructions by software; hardware; firmware; some combination of software, hardware, or firmware; or other mechanisms for configuring processing capabilities on the processors.

It should be appreciated that the description of the functionality provided by the different subsystems 312-322 described herein is for illustrative purposes and is not intended to be limiting, as any of subsystems 312-322 may provide more or less functionality than is described. For example, one or more of subsystems 312-322 may be eliminated, and some or all of the eliminated subsystem's functionality may be provided by other ones of subsystems 312-322. As another example, additional subsystems may be programmed to perform some or all of the functionality attributed herein to one of subsystems 312-322.

Although the present disclosure has been described in detail for the purpose of illustration based on what is currently considered to be the most practical and preferred embodiments, it is to be understood that such detail is solely for that purpose and that the disclosure is not limited to the disclosed embodiments but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques will be better understood with reference to the following enumerated embodiments:

A1. A method comprising: storing, at a physical access token, a set of records associated with a user including a first record comprising (a) a record identifier identifying the first record of the user and (b) a resource amount associated with the first record of the user, wherein the record identifier and resource amount are a same record identifier and resource amount of a first counterpart record of a set of counterpart records stored at a remote server system; receiving, by the physical access token, from an access terminal, input data (e.g., where the input data comprises a requested resource amount to the physical access token or other input data); transmitting, by the physical access token, based on the input data, authentication data to the access terminal (e.g., wherein the authentication data is generated based on (i) the resource amount and (ii) the set of records stored at the physical access token); and updating, by the physical access token, the set of records to reflect a transfer corresponding to the resource amount by generating a new record that (i) is a modified instance of the first record and (ii) comprises a resource amount and a record identifier different from the record identifier of the first counterpart record.

A2. The method of the preceding embodiment, further comprising storing, at the physical access token, a hash-based value generated based on a combination of inputs including data from the new record.

A3. The method of any of the preceding embodiments, wherein generating the authentication data comprises: hashing a combination of record identifiers of one or more records of the set of records stored at the physical access token, a random seed value, or the resource amount to obtain a hash value; and encrypting the hash value using a private key associated with the user.

A4. The method of any of the preceding embodiments, wherein the record identifier of the new record is based on an output generated by inputting a combination of (i) a secret key stored at the remote server system and the physical access token, (ii) a time associated with an establishment of connection to the physical access token, or (iii) the record identifier of the first record into a hash-based message authentication code (HMAC) algorithm.

A5. The method of any of the preceding embodiments, wherein, in connection to verification of the authentication data, the remote server system is configured to update the set of counterpart records to reflect a transfer corresponding to the resource amount by generating a new counterpart record that (i) is a modified instance of the first counterpart record and (ii) comprises a resource amount and a record identifier different from the record identifier of the first counterpart record.

A6. The method of any of the preceding embodiments, further comprising mapping, to a primary identifier associated with the user, the record identifier of the first record as a previous state and mapping, to the primary identifier associated with the user, the record identifier of the new record as a current-state record.

A7. The method of any of the preceding embodiments, receiving a return request from an access terminal for returning resources associated with the first record, wherein the return request comprises the record identifier of the first record and the resource amount; identifying, based on the primary identifier, the new record as the current-state record; updating the set of records to reflect a return corresponding to the resource amount by generating a second new record that (i) is a modified instance of the new record and (ii) comprises a resource amount and a record identifier different from the record identifier of the new record; and mapping, to the primary identifier associated with the user, the record identifier of the new record as another previous state and mapping, to the primary identifier associated with the user, the record identifier of the second new record as a current-state record.

A8. The method of any of the preceding embodiments, wherein, in connection with the return request, the remote server system generates a second new counterpart record that (i) is a modified instance of a new counterpart record and (ii) comprises a resource amount and a record identifier different from the record identifier of the new counterpart record.

A9. A tangible, non-transitory, computer-readable medium storing instructions that, when executed by a data processing apparatus, cause the data processing apparatus to perform operations comprising those of any of embodiments A1-A8.

A10. A system comprising: one or more processors; and memory storing instructions that, when executed by the one or more processors, cause the processors to effectuate operations comprising those of any of embodiments A1-A8.

A11. A system comprising means for performing any of embodiments A1-A8.

B1. A method comprising: receiving a verification request at a remote server system for verifying the physical access token at the access terminal (e.g., wherein the verification request comprises (i) authentication data generated by the physical access token and (ii) a resource amount associated with a first record of a user); accessing a set of records including a first record comprising (a) a record identifier identifying the first record of the user and (b) a resource amount associated with the first record of the user, and wherein the record identifier and resource amount are a same record identifier and resource amount of a first counterpart record of a set of counterpart records stored at a physical access token; in connection with the verification request, performing verification using a hash-based value derived from hashing a combination of inputs including data from the first record and the authentication data; and in response to the verification indicating a match between the authentication data and the hash-based value, updating the set of records to reflect a transfer corresponding to the resource amount by generating a new record that (i) is a modified instance of the first record and (ii) comprises a resource amount and a record identifier different from the record identifier of the first record.

B2. The method of the preceding embodiment, wherein performing verification by the remote server system comprises: hashing the first record of the set of records to a hash value; generating a reference value based on the authentication data and a public key associated with the user; and comparing the hash value and the reference value.

B3. The method of any of the preceding embodiments, wherein the record identifier of the new record is based on an output generated by inputting a combination of (i) a secret key stored at the remote server system and the physical access token, (ii) a time associated with an establishment of connection to the physical access token, or (iii) the record identifier of the first record into a hash-based message authentication code (HMAC) algorithm.

B4. The method of any of the preceding embodiments, wherein the authentication data is configured to be generated by: hashing a combination of record identifiers of one or more counterpart records of the set of counterpart records stored at the physical access token, a random seed value, or the resource amount to obtain a hash value; and encrypting the hash value using a private key associated with the user.

B5. The method of any of the preceding embodiments, further comprising transmitting an indication of authorization configured to cause presentation at the access terminal of an authorization related to the resource amount with the physical access token, the physical access token generating a new counterpart record that (i) is a modified instance of the first counterpart record and (ii) comprises a resource amount and a record identifier different from the record identifier of the first counterpart record.

B6. The method of any of the preceding embodiments, further comprising mapping, to a primary identifier associated with the user, the record identifier of the first record as a previous state and mapping, to the primary identifier associated with the user, the record identifier of the new record as a current-state record.

B7. The method of any of the preceding embodiments, comprising: receiving a return request from an access terminal for returning resources associated with the first record, wherein the return request comprises the record identifier of the first record and the resource amount; identifying, based on the primary identifier, the new record as the current-state record; updating the set of records to reflect a return corresponding to the resource amount by generating a second new record that (i) is a modified instance of the new record and (ii) comprises a resource amount and a record identifier different from the record identifier of the new record; and mapping, to the primary identifier associated with the user, the record identifier of the new record as another previous state and mapping, to the primary identifier associated with the user, the record identifier of the second new record as a current-state record.

B8. The method of any of the preceding embodiments, further comprising transmitting an indication of return configured to cause presentation at the access terminal of an authorization for the return related to the resource amount with the physical access token, the physical access token generating a second new counterpart record that (i) is a modified instance of a new counterpart record and (ii) comprises a resource amount and a record identifier different from the record identifier of the new counterpart record.

B9. A tangible, non-transitory, computer-readable medium storing instructions that, when executed by a data processing apparatus, cause the data processing apparatus to perform operations comprising those of any of embodiments B1-B8.

B10. A system comprising: one or more processors; and memory storing instructions that, when executed by the one or more processors, cause the processors to effectuate operations comprising those of any of embodiments B1-B8.

B11. A system comprising means for performing any of embodiments B1-B8.

C1. A method comprising: establishing a connection with the physical access token, wherein the physical access token stores a set of records including a first record of a user comprising (a) a record identifier identifying the first record and (b) a resource amount for transfer between the first record and a second record, and wherein the record identifier and resource amount are a same record identifier and resource amount of a first counterpart record of a set of counterpart records stored at a remote server system; responsive to transmitting input data comprising a requested resource amount, receiving, from the physical access token, authentication data generated based on (i) the resource amount, and (ii) the set of records stored at the physical access token; transmitting, to the remote server system, a verification request for verifying the physical access token, (e.g., wherein the verification request comprises the authentication data and the resource amount) wherein, in connection with the verification request, the remote server system performs verification using a hash-based value derived from hashing a combination of inputs including data from the first counterpart record of the set of counterpart records stored at the remote server system; and in response to the verification indicating a match between the authentication data and the hash-based value derived from hashing of the combination of inputs, receiving an indication of authorization and causing presentation of an authorization related to the resource amount.

C2. The method of the preceding embodiment, wherein in connection to the verification, the remote server system is configured to update the set of counterpart records to reflect a transfer corresponding to the resource amount by generating a new counterpart record that (i) is a modified instance of the first counterpart record and (ii) comprises a resource amount and a record identifier different from the record identifier of the first counterpart record.

C3. The method of any of the preceding embodiments, wherein, in connection to transmitting input data comprising the requested resource amount, the physical access token is configured to update the set of records to reflect a transfer corresponding to the resource amount by generating a new record that (i) is a modified instance of the first record and (ii) comprises a resource amount and a record identifier different from the record identifier of the first record.

C4. The method of any of the preceding embodiments, wherein the record identifier of the new record is based on an output generated by inputting a combination of (i) a secret key stored at the remote server system and the physical access token, (ii) a time associated with an establishment of connection to the physical access token, or (iii) the record identifier of the first record into a hash-based message authentication code (HMAC) algorithm.

C5. The method of any of the preceding embodiments, wherein, in connection to the verification, the remote server system is configured to modify the set of counterpart records to reflect (i) a first transfer of at least some of the resource amount of the first counterpart record to a second counterpart record or (ii) a second transfer of at least some of the resource amount of the second counterpart record to one or more records associated with one or more users by modifying record identifiers and resource amounts of each.

C6. The method of any of the preceding embodiments, wherein, in connection to transmitting input data comprising the requested resource amount, the physical access token is configured to modify the set of records to reflect (i) a first transfer of at least some of the resource amount of the first record to the second record or (ii) a second transfer of at least some of the resource amount of the second record to one or more records associated with one or more users by modifying record identifiers and resource amounts of each.

C7. The method of any of the preceding embodiments, wherein performing verification by the remote server system comprises: hashing the first counterpart record of the set of counterpart records to a hash value; generating a reference value based on the authentication data and a public key associated with the user; and the hash value and the reference value.

C8. The method of any of the preceding embodiments, wherein the authentication data is configured to be generated by: hashing a combination of record identifiers of one or more records of the set of records stored at the physical access token, a random seed value, or the resource amount to obtain a hash value; and encrypting the hash value using a private key associated with the user.

C9. A tangible, non-transitory, computer-readable medium storing instructions that, when executed by a data processing apparatus, cause the data processing apparatus to perform operations comprising those of any of embodiments C1-C8.

C10. A system comprising: one or more processors; and memory storing instructions that, when executed by the one or more processors, cause the processors to effectuate operations comprising those of any of embodiments C1-C8.

C11. A system comprising means for performing any of embodiments C1-C8.

What is claimed is:

1. A stored value card for facilitating authentication at a network access terminal for modification of network records at a remote server system to prevent malicious or unauthorized access to associated resources, the stored value card comprising:

one or more processors and non-transitory computer-readable media comprising instructions that, when executed by the one or more processors, cause operations comprising:

responsive to establishing a connection with the network access terminal, accessing a set of records stored at the stored value card, the set of records being associated with a user and including a first record comprising (a) a record identifier identifying the first record of the user and (b) a resource amount balance of the first record of the user, wherein the record identifier and resource amount balance of the first record are a same record identifier and resource amount balance of a first counterpart record of a set of counterpart records stored at the remote server system;

receiving, from the network access terminal, input data comprising a random seed value and a requested resource amount;

responsive to receiving the input data, transmitting authentication data to the network access terminal, wherein the authentication data is generated based on (i) the random seed value, (ii) the requested resource amount, and (iii) the resource amount balance of the first record and other data of the set of records stored at the stored value card; and updating the set of records to reflect a transfer corresponding to the requested resource amount by generating and storing, at the stored value card, a new record that (i) is a modified version of the first record and (ii) comprises a resource amount balance and a record identifier different from the record identifier of the first counterpart record.

2. The stored value card of claim 1, wherein generating the authentication data comprises:

hashing a combination of respective record identifiers and resource amount balances of two or more records of the set of records stored at the stored value card, the random seed value, and the requested resource amount to obtain a hash value; and encrypting the hash value using a private key associated with the user.

3. The stored value card of claim 1, wherein the record identifier of the new record is based on an output generated by inputting a combination of (i) a secret key stored at the remote server system and the stored value card, (ii) a time associated with an establishment of connection to the stored value card, and (iii) the record identifier of the first record into a hash-based message authentication code (HMAC) algorithm.

4. The stored value card of claim 1, wherein, in connection to verification of the authentication data, the remote server system is configured to update the set of counterpart records to reflect a transfer corresponding to the requested resource amount by generating a new counterpart record that (i) is a modified version of the first counterpart record and (ii) comprises a resource amount balance and a record identifier (a) different from the record identifier of the first counterpart record and (b) the same as the record identifier of the new record stored at the stored value card.

5. A method comprising:

storing, at a stored value card, a set of records associated with a user including a first record comprising (a) a record identifier identifying the first record of the user and (b) a resource amount balance of the first record of the user, wherein the record identifier and resource amount balance of the first record are a same record identifier and resource amount balance of a first counterpart record of a set of counterpart records stored at a remote server system;

receiving, by the stored value card, from an access terminal, input data comprising a random seed value and a requested resource amount;

transmitting, by the stored value card, based on the input data, authentication data to the access terminal, wherein the authentication data is generated based on (i) the random seed value, (ii) the requested resource amount, and (iii) the resource amount balance of the first record and other data of the set of records stored at the stored value card; and updating, by the stored value card, the set of records to reflect a transfer corresponding to the requested resource amount by generating a new record that (i) is a modified instance of the first record and (ii) comprises a resource amount balance and a record identifier different from the record identifier of the first counterpart record.

6. The method of claim 5, further comprising storing, at the stored value card, a hash-based value generated based on a combination of inputs including data from the new record.

7. The method of claim 5, wherein generating the authentication data comprises:

hashing a combination of (i) respective record identifiers and resource amounts of two or more records of the set of records stored at the stored value card, (ii) the random seed value, and (iii) the requested resource amount to obtain a hash value; and encrypting the hash value using a private key associated with the user.

8. The method of claim 5, wherein the record identifier of the new record is based on an output generated by inputting a combination of (i) a secret key stored at the remote server system and the stored value card, (ii) a time associated with an establishment of connection to the stored value card, or (iii) the record identifier of the first record into a hash-based message authentication code (HMAC) algorithm.

9. The method of claim 5, wherein, in connection to verification of the authentication data, the remote server system is configured to update the set of counterpart records to reflect a transfer corresponding to the requested resource amount by generating a new counterpart record that (i) is a modified instance of the first counterpart record and (ii) comprises a resource amount and a record identifier different from the record identifier of the first counterpart record.

10. The method of claim 9, further comprising mapping, to a primary identifier associated with the user, the record identifier of the first record as a previous state and mapping, to the primary identifier associated with the user, the record identifier of the new record as a current-state record.

11. The method of claim 10, further comprising:

receiving a return request from the access terminal for returning resources associated with the first record, wherein the return request comprises the record identifier of the first record and the requested resource amount;

identifying, based on the primary identifier, the new record as the current-state record;

updating the set of records to reflect a return corresponding to the requested resource amount by generating a second new record that (i) is a modified instance of the new record and (ii) comprises a resource amount and a record identifier different from the record identifier of the new record; and mapping, to the primary identifier associated with the user, the record identifier of the new record as another previous state and mapping, to the primary identifier associated with the user, the record identifier of the second new record as a current-state record.

12. The method of claim 11, wherein, in connection with the return request, the remote server system generates a second new counterpart record that (i) is a modified instance of a new counterpart record and (ii) comprises a resource amount and a record identifier different from the record identifier of the new counterpart record.

13. One or more non-transitory, computer-readable media comprising instructions that, when executed by one or more processors, cause operations comprising:

accessing a set of records stored at a card, the set of records being associated with a user and including a first record comprising (a) a record identifier identifying the first record of the user and (b) a resource amount balance of the first record of the user, wherein the record identifier and resource amount balance of the first record are a same record identifier and resource amount balance of a first counterpart record of a set of counterpart records stored at a remote server system;

receiving, from an access terminal, input data comprising a random seed value and a requested resource amount;

transmitting, based on the input data, authentication data to the access terminal, wherein the authentication data is generated based on (i) the requested resource amount and (ii) the resource amount balance of the first record and other data of the set of records stored at the card; and updating the set of records to reflect a transfer corresponding to the requested resource amount by generating a new record that (i) is a modified instance of the first record and (ii) comprises a resource amount balance and a record identifier different from the record identifier of the first counterpart record.

14. The one or more non-transitory, computer-readable media of claim 13, wherein the instructions further cause operations comprising storing, at the card, a hash-based value generated based on a combination of inputs including data from the new record.

15. The one or more non-transitory, computer-readable media of claim 13, wherein generating the authentication data comprises:

hashing a combination of (i) respective record identifiers and resource amounts of two or more records of the set of records stored at the card, (ii) the random seed value, and (iii) the requested resource amount to obtain a hash value; and encrypting the hash value using a private key associated with the user.

16. The one or more non-transitory, computer-readable media of claim 13, wherein the record identifier of the new record is based on an output generated by inputting a combination of (i) a secret key stored at the remote server system and the card, (ii) a time associated with an establishment of connection to the card, and (iii) the record identifier of the first record into a hash-based message authentication code (HMAC) algorithm.

17. The one or more non-transitory, computer-readable media of claim 13, wherein, in connection to verification of the authentication data, the remote server system is configured to update the set of counterpart records to reflect a transfer corresponding to the requested resource amount by generating a new counterpart record that (i) is a modified instance of the first counterpart record and (ii) comprises a resource amount and a record identifier different from the record identifier of the first counterpart record.

18. The one or more non-transitory, computer-readable media of claim 17, wherein the instructions further cause operations comprising mapping, to a primary identifier associated with the user, the record identifier of the first record as a previous state and mapping, to the primary identifier associated with the user, the record identifier of the new record as a current-state record.

19. The one or more non-transitory, computer-readable media of claim 18, wherein the instructions further cause operations comprising:

receiving a return request from the access terminal for returning resources associated with the first record, wherein the return request comprises the record identifier of the first record and the requested resource amount;

identifying, based on the primary identifier, the new record as the current-state record;

updating the set of records to reflect a return corresponding to the requested resource amount by generating a second new record that (i) is a modified instance of the new record and (ii) comprises a resource amount and a record identifier different from the record identifier of the new record; and mapping, to the primary identifier associated with the user, the record identifier of the new record as another previous state and mapping, to the primary identifier associated with the user, the record identifier of the second new record as a current-state record.

20. The one or more non-transitory, computer-readable media of claim 19, wherein, in connection with the return request, the remote server system generates a second new counterpart record that (i) is a modified instance of a new counterpart record and (ii) comprises a resource amount and a record identifier different from the record identifier of the new counterpart record.

* * * * *